(12) United States Patent
Sunaga et al.

(10) Patent No.: US 6,758,570 B2
(45) Date of Patent: Jul. 6, 2004

(54) REFLECTIVE OPTICAL ELEMENT, REFLECTIVE OPTICAL SYSTEM, IMAGE DISPLAY SYSTEM, AND FINDER OPTICAL SYSTEM

(75) Inventors: Toshihiro Sunaga, Tokyo (JP); Yumiko Kato, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 4 days.

(21) Appl. No.: 10/176,926

(22) Filed: Jun. 21, 2002

(65) Prior Publication Data

US 2003/0063400 A1 Apr. 3, 2003

(30) Foreign Application Priority Data

Jun. 26, 2001 (JP) .................................. 2001-193597
Jun. 27, 2001 (JP) .................................. 2001-194419

(51) Int. Cl.[7] .............................................. G02B 5/08
(52) U.S. Cl. ...................... 359/861; 359/837; 359/857; 359/858
(58) Field of Search ............................... 359/861, 856, 359/858, 364, 834, 837, 857; 396/384–386

(56) References Cited

U.S. PATENT DOCUMENTS

| | | | |
|---|---|---|---|
| 3,464,338 A | * 6/1969 | Jurenz | 396/272 |
| 5,825,560 A | 10/1998 | Ogura et al. | 359/822 |
| 5,847,887 A | 12/1998 | Ogura et al. | 359/822 |
| 5,973,858 A | 10/1999 | Sekita | 359/729 |
| 5,995,287 A | 11/1999 | Sekita | 359/599 |
| 5,999,311 A | 12/1999 | Nanba et al. | 359/365 |
| 6,021,004 A | 2/2000 | Sekita et al. | 359/676 |
| 6,097,550 A | 8/2000 | Kimura | 359/729 |
| 6,120,156 A | 9/2000 | Akiyama | |
| 6,124,986 A | 9/2000 | Sekita et al. | 359/691 |
| 6,163,400 A | 12/2000 | Nanba | 359/365 |
| 6,166,866 A | 12/2000 | Kimura et al. | 359/729 |
| 6,181,470 B1 | 1/2001 | Sekita | 359/364 |
| 6,215,596 B1 | 4/2001 | Araki et al. | 359/631 |
| 6,249,391 B1 | * 6/2001 | Hayakawa et al. | 359/834 |
| 6,268,963 B1 | 7/2001 | Akiyama | 359/631 |
| 6,270,224 B1 | 8/2001 | Sunaga et al. | 359/857 |
| 6,278,553 B1 | 8/2001 | Akiyama | 359/627 |
| 6,292,309 B1 | 9/2001 | Sekita et al. | 359/822 |
| 6,366,411 B1 | 4/2002 | Kimura et al. | 359/729 |
| 6,373,645 B1 | 4/2002 | Kamo | 359/834 |

FOREIGN PATENT DOCUMENTS

| | | |
|---|---|---|
| JP | 61-156018 | 7/1986 |
| JP | 1-116616 | 5/1989 |
| JP | 11-64734 | 3/1999 |
| JP | 11-202205 | 7/1999 |
| JP | 2000-241707 | 9/2000 |
| JP | 2000-321500 | 11/2000 |

OTHER PUBLICATIONS

English language abstract for JP 8–292371.
English language abstract for JP 8–292372.
English language abstract for JP 9–005650.
English language abstract for JP 9–222561.
English language abstract for JP 9–258105.
English language abstract for JP 11–064734.

* cited by examiner

*Primary Examiner*—Audrey Chang
*Assistant Examiner*—Denise S. Allen
(74) *Attorney, Agent, or Firm*—Morgan & Finnegan L.L.P.

(57) ABSTRACT

The invention provides a reflective optical element which has three or more reflecting surfaces by which a light flux from an object is successively reflected. In an area enclosed by each of the reflecting surfaces, the reference axis intersects at least two times and the light flux forms an intermediate image. The reference axis is a path of the light beam which passes through the center of an object surface, is then reflected by the reflecting surfaces, and passes through a center of a pupil. The reflective optical element satisfies the following condition:

$$4 \cdot f \tan\theta < ea$$

wherein $\theta$ is a maximum field angle that passes through the pupil in a plane that includes the reference axis, f is a focal length of an optical part between the pupil and an intermediate-image forming surface, and ea is a maximum optical effective diameter of the reflective optical element.

14 Claims, 15 Drawing Sheets

REFLECTIVE OPTICAL ELEMENT, REFLECTIVE OPTICAL SYSTEM, IMAGE DISPLAY SYSTEM, AND FINDER OPTICAL SYSTEM

BACKGROUND OF THE INVENTION

1. Field of the Invention

This invention relates to a reflective optical element and a reflective optical system that are suitable for optical apparatus such as video cameras, still cameras, head-mounted displays, and finders.

2. Description of Related Art

An example of the reflective optical system is proposed in Japanese Laid-Open No. H08-292371. FIG. 13 shows the optical system proposed in this publication.

In FIG. 13, a light flux emitted from an object passes through an aperture-stop S and enters a reflective optical element B101. The light flux incident on the reflective optical element B101 is refracted by a first surface R101, is then reflected by a second surface R102, a third surface R103, a fourth surface R104, a fifth surface R105 and a sixth surface R106, is then refracted by a seventh surface R107, and is emitted from the reflective optical element B101.

In the reflective optical element B101, the light flux emitted from the object forms a primary image on an intermediate image-formation surface near the second surface R102, and forms an image of the pupil near the fifth surface R105. The light flux emitted from the reflective optical element B101 finally forms an image on an image pickup surface (e.g., image pickup surface of an image pickup device like a CCD or CMOS) IS.

This reflective optical system uses the reflective optical element B101 in which a plurality of curved and flat reflecting surfaces are integrally formed, thereby achieving a size reduction of the whole reflective optical system, and excluding the influence of mirror arrangement accuracy (assembly accuracy) upon an optical performance which is liable to cause problems in the reflective optical system using reflecting mirrors.

Additionally, the aperture-stop S is disposed on the side nearest to the object in the optical system, and an object image is formed at least once in the reflective optical element B101, thereby enabling a reduction in the effective diameter of the optical element although it is a reflective optical element with a wide field angle.

Further, appropriate refractive power is given to the plurality of reflecting surfaces that constitute the reflective optical element, and each reflecting surface is arranged in a decentering manner, thereby bending the optical path in the optical system into a desired shape, and achieving a shortening of the whole length in a predetermined direction of the optical system.

This decentered optical system is called an off-axial optical system. In greater detail, on the assumption that an axis along a light beam passing through a center of an image and through a center of a pupil is a reference axis, this optical system is defined as an optical system that includes a curved surface (off-axial curved surface) whose normal at an intersection with a reference axis does not exist on the reference axis and in which the reference axis forms a bent shape.

In this off-axial optical system, the constructive surface generally is decentered surface, and an eclipse never occurs in the reflecting surface. Therefore, it is easy to construct an optical system using reflecting surfaces. Japanese Laid-Open No. H8-292372, Japanese Laid-Open No. H9-222561, and Japanese Laid-Open No. H9-258105, etc. propose a variable-power optical system that uses these optical elements, and Japanese Laid-Open No. H9-5650, etc. propose its design method.

In a reflective optical system proposed in Japanese Laid-Open No. H8-292371, an intermediate image is formed inside, in order to make the effective diameter of an optical surface in an optical element smaller. Therefore, the optical path length tends to inevitably lengthen, and the optical element tends to extend longitudinally.

Since this optical element has a great degree of freedom to arrange reflecting surfaces, a length in a certain direction can be reduced, nevertheless the whole volume increases.

If an optical path merely intersects as in an optical element proposed in Japanese Laid-Open No. H11-064734, each reflecting surface is great in size, and each effective diameter has almost the same length. Further, in order to make this optical element compact, there is a need to design normals of three or more reflecting surfaces to face each other, and there is a need to cause the optical path to intersect two or more times in an area enclosed by the plurality of reflecting surfaces.

FIG. 14 is a typical drawing of an optical element in which three reflecting surfaces, each of which has almost the same effective diameter, are arranged so that normals of these surfaces face each other. A light flux emitted from an object is reflected by the reflecting surfaces R201, R202, R203, and thereafter must pass between the reflecting surface R201 and the reflecting surface R202.

However, since the distance between the reflecting surfaces R201 and R202 is narrow, the light flux cannot pass therebetween. The distance between the reflecting surfaces R201 and R202 must be increased, or, alternatively, the size of the reflecting surface R202 must be reduced, in order to cause the light flux to pass therebetween.

Since an increase in the distance between the reflecting surfaces R201 and R202 is contrary to a size reduction of the optical element, it is necessary to reduce the size of the reflecting surface R202.

FIG. 15 shows an example in which the size of the reflecting surface R202 is reduced more than in FIG. 14. In this example, the distance between the reflecting surfaces R201 and R202 is sufficiently great, and therefore the light flux reflected by the reflecting surface R203 can be caused to pass between the reflecting surfaces R201 and R202.

The reflective optical element constructed in this way can be used for an observation optical system of, for example, a head-mounted display or an optical finder of a camera. Also in this case, large magnification and size reduction of the reflective optical element are strongly demanded for the performance improvement and size reduction of the head-mounted display and camera.

SUMMARY OF THE INVENTION

It is an object of the present invention to provide a reflective optical element in which an optical path can intersect two or more times by use of three or more reflecting surfaces in spite of being compact and in which a light flux can be easily emitted from an area enclosed by these reflecting surfaces, and provide a reflective optical system and an optical apparatus that use the reflective optical element.

In order to achieve the object, the reflective optical element of the present invention is structured as follows.

That is, the reflective optical element has three or more reflecting surfaces by which a light flux from an object is successively reflected, and a reference axis intersects at least two times and the light flux forms an intermediate image in an area enclosed by the reflecting surfaces. The reference axis is a path of the light beam which passes through the center of an object surface, is then reflected by the reflecting surfaces, and passes through a center of a pupil. The reflective optical element satisfies the following condition:

$$4 \cdot f \cdot \tan\theta < ea \qquad (1)$$

wherein θ is a maximum field angle that passes through the pupil in a plane that includes the reference axis, f is a focal length of an optical part between the pupil and the intermediate-image, and ea is a maximum one of optical effective diameters of surfaces which the reflective optical element has.

If the upper limit of the condition (1) is exceeded, the minimum optical effective diameter in the plane that includes the reference axis becomes greater than half the maximum optical effective diameter, and, as a result, each reflecting surface becomes greater, and therefore it becomes difficult to emit a light flux from between the reflecting surfaces in the area enclosed by the reflecting surfaces.

In order to achieve the object, the finder optical system of the present invention for guiding a light flux from an object to the eye of an observer is structured as follows. That is, the finder optical system has a reflective optical element that includes a first reflecting surface by which a light flux from the object is reflected, a second reflecting surface by which the light flux reflected by the first reflecting surface is reflected, and a third reflecting surface by which the light flux reflected by the second reflecting surface is reflected. In an area enclosed by the first to third reflecting surfaces, a reference axis has two crossed points at a position where the optical path from the second reflecting surface to the third reflecting surface intersects and at a position where the optical path from the third reflecting surface to the pupil intersects with the optical path from the object surface to the first reflecting surface, and the light flux forms an intermediate image in an area enclosed by the first to third reflecting surfaces. The reference axis is a path of a light beam, which is emitted from the center of an object surface, is then reflected by the first, second, and third reflecting surfaces, and passes through the center of a pupil.

A detailed configuration of the reflective optical element, reflective optical system, finder optical system, and optical apparatus of the invention, the above and other objects and features of the invention will be apparent from the embodiments, described below.

DETAILED DESCRIPTION OF THE PREFERRED EMBODIMENTS

Hereinafter, preferred embodiments of the invention will be described in detail with reference to the drawings.

First, before giving a detailed description of embodiments of the present invention, a description will be given of the indicating manner of the structural parameters of an optical system in each embodiment and common points in all of the embodiments.

Figure 12:
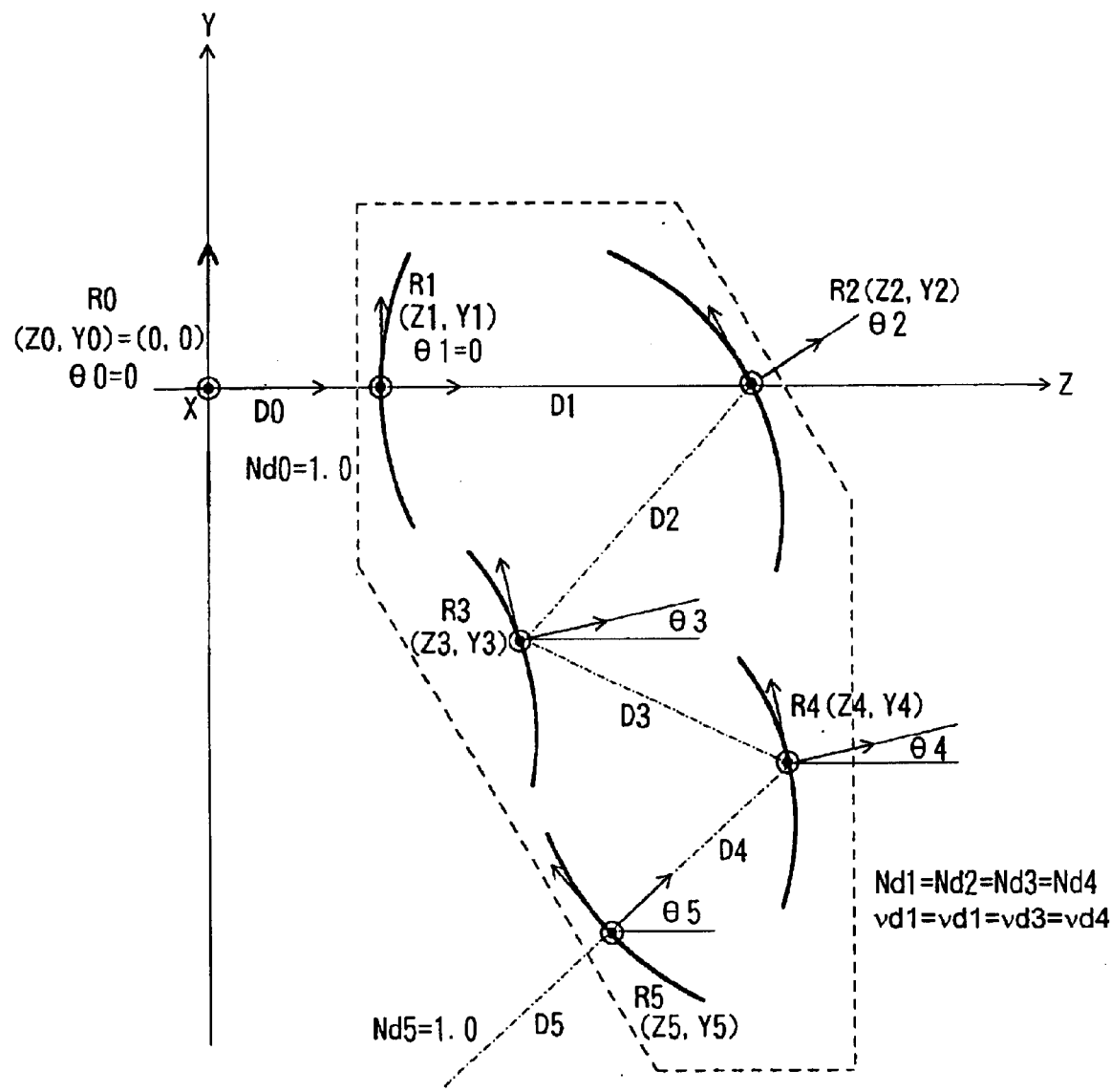
FIG. 12 is an explanatory diagram of a coordinate system in each of the aforementioned embodiments.
Figure 13:
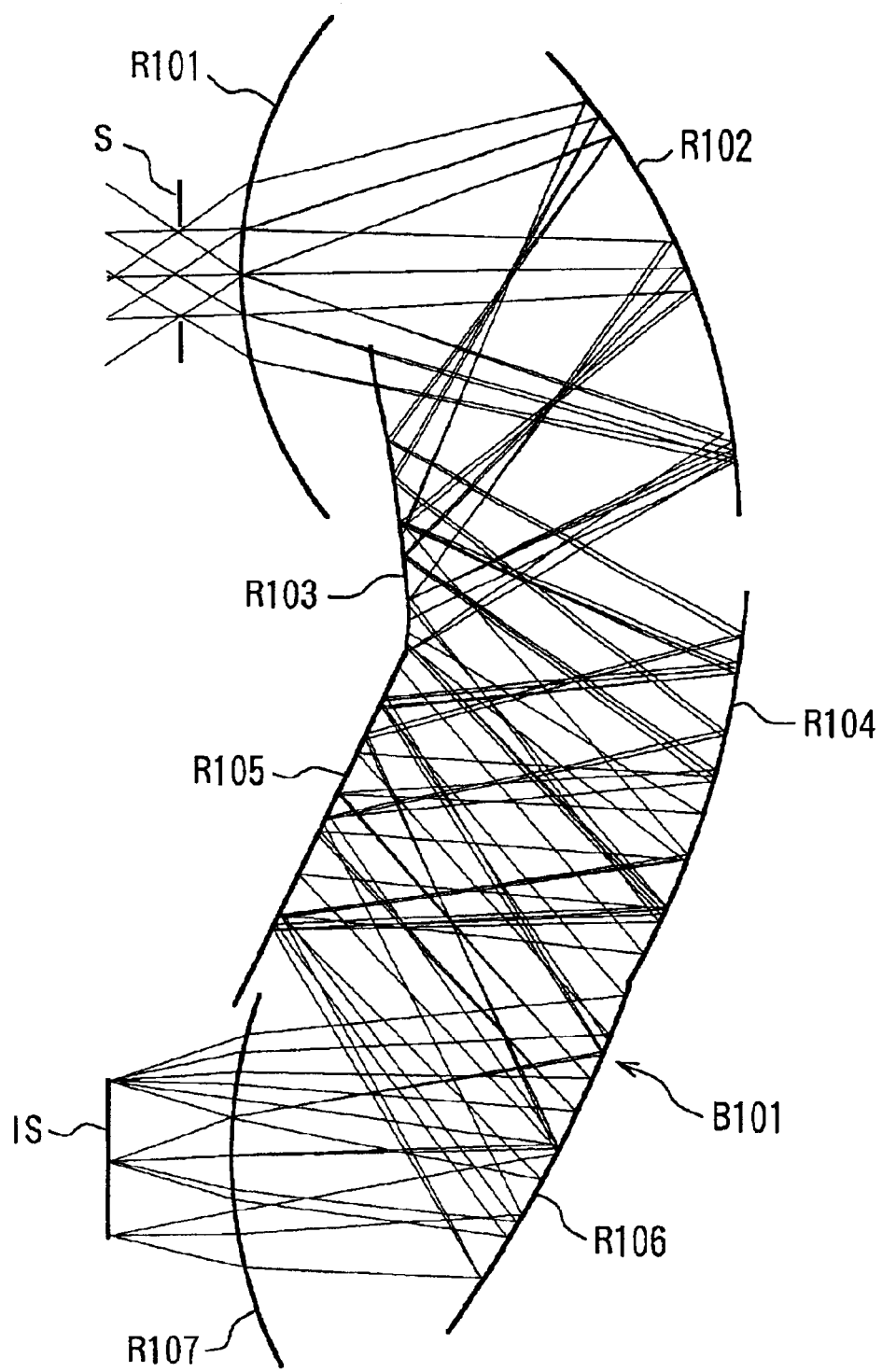
FIG. 13 is an optical sectional view in a YZ plane of a conventional reflective optical element.
Figure 14:
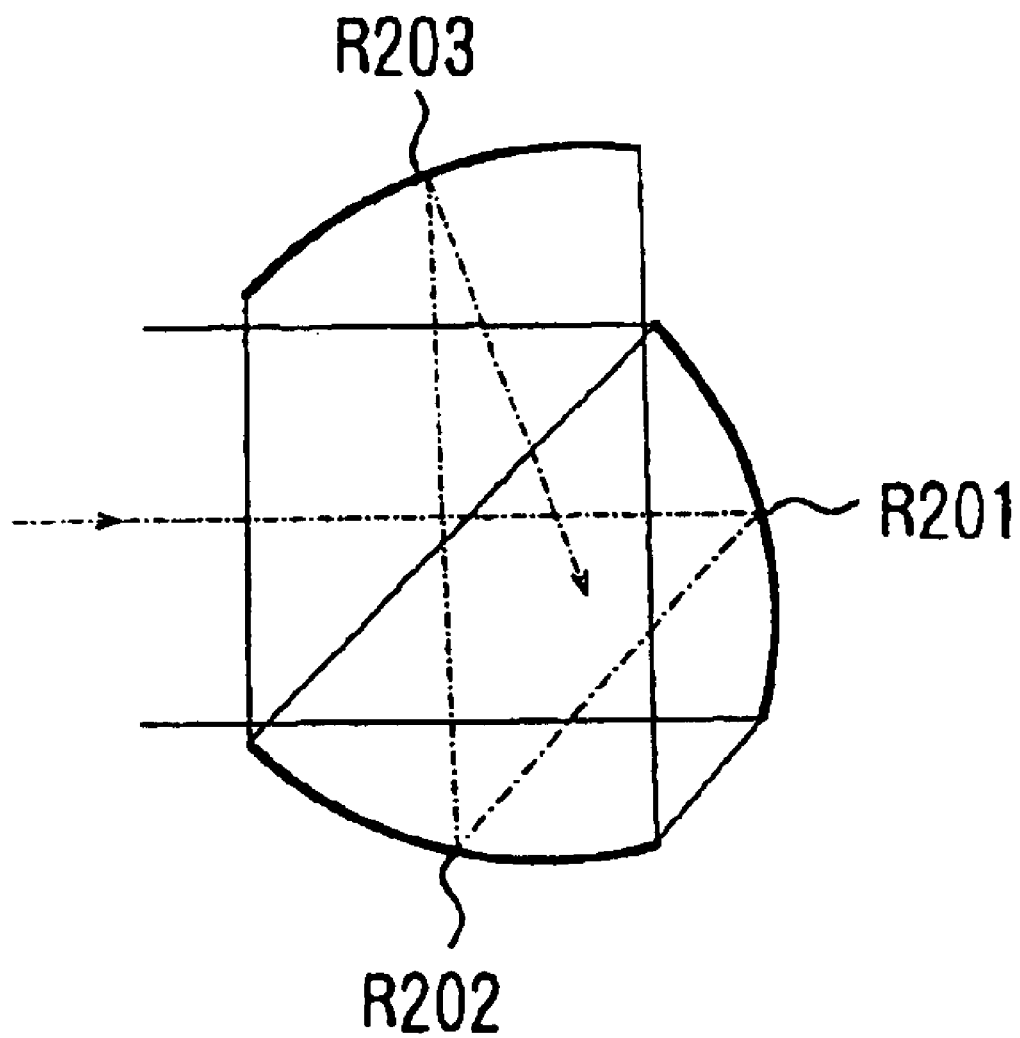
FIG. 14 is a typical drawing of a reflecting-surface arrangement of a reflective optical element which is an antecedent of the present invention.
Figure 15:
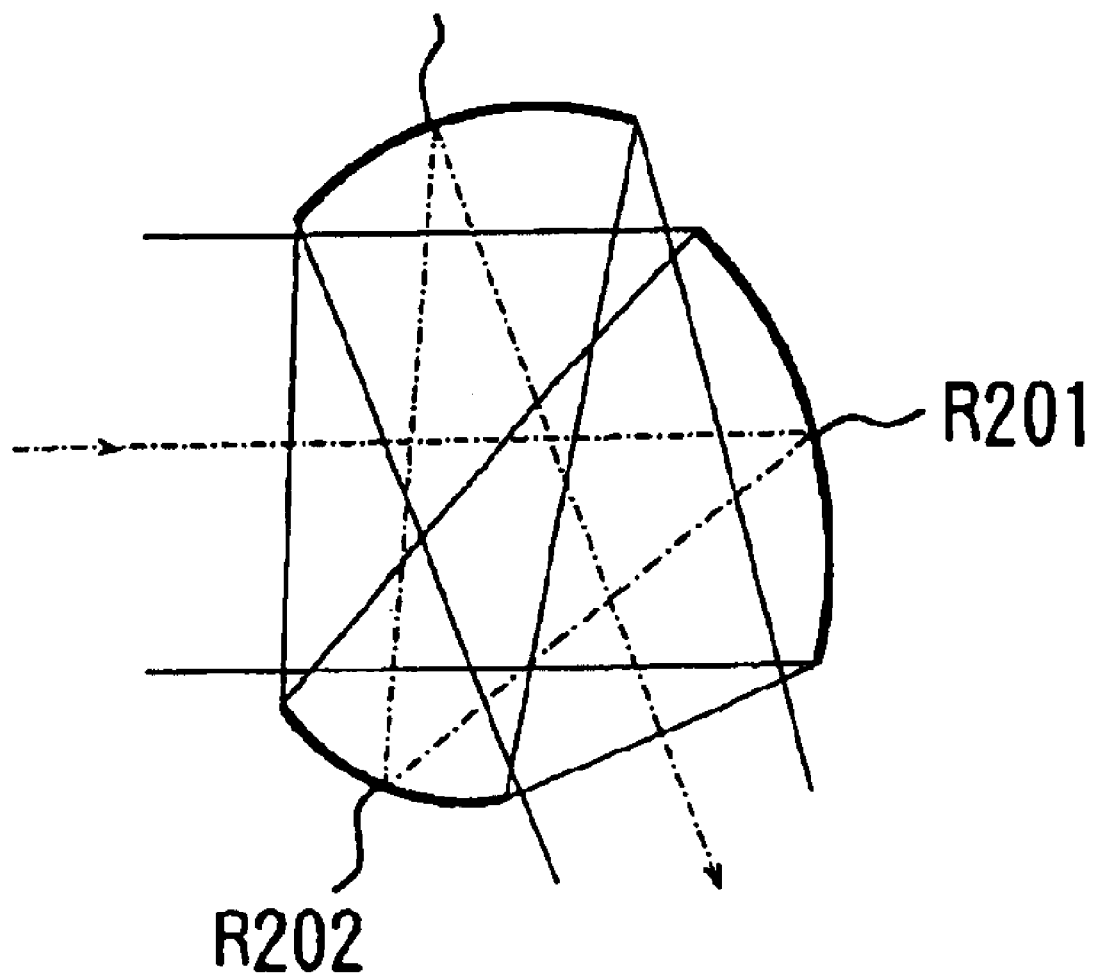
FIG. 15 is a typical drawing of a reflecting-surface arrangement of a reflective optical element which is an antecedent of the present invention.

FIG. 12 is an explanatory diagram of a coordinate system that defines the structural data of an optical system in each embodiment of the present invention.

In each embodiment of the present invention, in an image formation optical system, it is assumed that an i-th surface along a light beam traveling from an object side to an image surface (this beam is indicated by the alternate long and short dash line in FIG. 12 and is called a reference-axis light beam) is an i-th surface. In an observation optical system, it is assumed that, contrary to the traveling direction of the light beam, an i-th surface along an optical path from an observer side to a to-be-observed object side is an i-th surface ("-th" is a suffix used to indicate ordinal numbers).

In the following description, definitions are described on the basis of the image formation optical system unless a special note is presented. If an aperture-stop surface of the observation optical system is regarded as the pupil surface of the observation optical system, and if the final image surface of the image formation optical system is regarded as the to-be-observed surface (object surface) of the observation optical system, the following description is applicable also to the observation optical system.

In FIG. 12, the 0th surface R0 is an aperture-stop, the 1st surface R1 is a refraction surface coaxial with the 0th surface R0, the 2nd surface R2 is a reflecting surface (1st reflecting surface) that has been tilted with respect to the 1st surface R1, the 3rd surface R3 and 4th surface R4 are reflecting surfaces (2nd and 3rd reflecting surfaces) that have been shifted and tilted with respect to each prior surface, and the 5th surface R5 is a refraction surface that has been shifted and tilted with respect to the 4th surface R4.

The 1st to the 5th surfaces R1 to R5 are formed on a single optical element (reflective optical element) made of a transparent member that consists of a medium such as glass or plastic.

Therefore, in FIG. 12, the medium from the object surface, not shown, to the 1st surface R1 consists of air, the medium from the 1st surface R1 to the 5th surface R5 consists of a common medium like glass or plastic, and the medium from the 5th surface R5 to the final image surface, not shown, consists of air.

Since the optical system of each embodiment of the present invention is an off-axial optical system, each surface that constitutes the optical system does not have a common optical axis. Therefore, in each embodiment, an absolute coordinate system in which the center of the light flux effective diameter of the 0th surface R0 is the original point is set.

The center point of the light flux effective diameter of the 0th surface R0 is defined as the original point, and the path of a light beam (i.e., reference-axis light beam) that passes through the original point and via the final image formation surface (or observation image surface; the same applies hereinafter) is defined as the reference axis of an optical system. In addition, the reference axis in each embodiment has a direction. This direction is a direction in which the reference-axis light beam travels for image formation (in the observation optical system, it is contrary to the traveling direction for observation).

Although the reference axis that serves as the base of an optical system is set in such a way as mentioned above in each embodiment, what is needed to determine an axis serving as the base is to employ an axis convenient for optical design, or convenient for aberration arrangement, or convenient for the shape expression of each surface that constitutes the optical system. However, generally, a path of a light beam passing through a center of an image-surface and through a center of any one of an aperture-stop, an entrance pupil, an exit pupil, a surface nearest to the incident side of the optical system and a final-surface is set to be the reference axis serving as the base of the optical system.

In each embodiment, the reference axis to be set is a path in which a light beam (reference-axis light beam RA) passing through the 0th surface R0 i.e., through the center of the light flux effective diameter of an aperture-stop surface and leading to the center of the final image formation surface is refracted/reflected by each refraction surface and by each reflecting surface. The order of the surfaces is set to be order in which the reference-axis light beam is refracted and reflected.

Therefore, according to the determined order of each surface and according to the law of refraction/reflection, the reference axis finally reaches the center of the image surface while changing its direction.

Basically, tilt planes that constitute the optical system are all tilted in the same plane in each embodiment. Therefore, each axis of the absolute coordinate system is defined as follows.

Z axis: a reference axis that passes through the original point and extends in the direction of the second surface R2

Y axis: a straight line that passes through the original point and forms an angle of 90° counterclockwise with respect to the Z axis in the tilt plane (in the sheet of FIG. 12)

X axis: a straight line that passes through the original point and is perpendicular to the Z axis and Y axis (i.e., a straight line perpendicular to the sheet of FIG. 12)

In order to express the surface shape of the i-th surface that constitutes the optical system, the expression of the shape by a local coordinate system in which a point where the reference axis intersects with the i-th surface is the original point is preferable to the expression thereof by the absolute coordinate system, for easy recognition of the shape. Therefore, the surface shape of the i-th surface is expressed by the local coordinate system when structural data in each embodiment is exhibited.

A tilt angle in the YZ plane of the i-th surface (i=0,1,2 . . . ) is expressed by angle $\theta i$ (unit °) in which a counterclockwise direction with respect to the Z axis of the absolute coordinate system is positive. Therefore, in each embodiment, the original point of the local coordinates of each surface is on the YZ plane of FIG. 12. The XZ plane and the XY plane have no planar decentration.

The y and z axes of the local coordinates (x,y,z) of the i-th surface are tilted at angle $\theta i$ with respect to the absolute coordinate system (X,Y,Z) in the YZ plane, and they are concretely set as follows.

z axis: a straight line that passes through the original point of the local coordinates and forms angle $\theta i$ in the counterclockwise direction with respect to the Z axis of the absolute coordinate system in the YZ plane y axis: a straight line that passes through the original point of the local coordinates and forms an angle of 90° in the counterclockwise direction with respect to the z direction in the YZ plane x axis: a straight line that passes through the original point of the local coordinates and is perpendicular to the YZ plane Di designates a scalar indicating the distance between the original point of the local coordinates of the i-th surface and the (i+1)-th surface, and Ndi and vdi designate the refractive index and Abbe number, respectively, of a medium between the i-th surface and the (i+1)-th surface. In numerical examples, sectional views of the optical system and numerical data are shown.

In each embodiment, a spherical surface and a rotationally asymmetric aspherical surface are provided. "rotationally asymmetric surface" means curved shape in which the symmetric surface is below one. A curvature radius ri is given as a spherical shape to a spherical surface part of these. Let the sign of curvature radius ri be minus if the center of curvature is on the 0th-surface side along a reference axis (indicated by the alternate long and short dash line in FIG. 12) that extends from the 0th surface to the image surface, and be a plus if the center of curvature is on the image formation surface side.

The spherical surface has a shape expressed by the following expression.

$$Z=\{(x^2+y^2)/ri\}/[1+\{1-(X^2+y^2)/ri^2\}^{1/2}]$$

The optical system of each embodiment has at least three rotationally asymmetric aspherical surfaces, and its shape is expressed by the following expression.

$$Z=C02y^2+C20x^2+C03y^3+C21x^2y+C04y^4+C22x^2y^2+C40x^4+C05y^5+C23x^2y^3+C41x^4y+C06y^6+C24x^2y^4+C42x^4y^2+c60x^6$$

Since the curved-surface expressions mentioned above have only even-ordered terms with respect to x, the curved surface specified by the equations has a planarly symmetric shape in which the yz plane serves as a symmetric plane. If the following condition is satisfied, a shape symmetrical to the xz plane is shown.

$$C03 = C21 = t = 0$$

If the following conditions are satisfied, a rotationally symmetric shape is shown. If these conditions are not satisfied, a non-rotationally symmetric shape is shown.

$$C02 = C20 \quad C04 = C40 = C22/2 \quad C06 = C60 = C24/3 = C42/3$$

In each embodiment, a horizontal half-field angle uY denotes half the maximum field angle of a light flux incident upon the refraction surface R1 in the YZ plane of FIG. 12, and a vertical half-field angle uX denotes half the maximum field angle of a light flux incident upon the refraction surface R1 in the XZ plane. The diameter of the aperture-stop is denoted by an aperture-stop diameter. This is related to brightness of the optical system.

When a lateral aberration diagram of a numerical example is shown, the lateral aberration of a light flux in which a vertical incidence angle and a horizontal incidence angle with the refraction surface R1 are specified as follows are shown.

$$(0, uY), (0, 0), (0, -uY), (uX, uY), (uX, 0), (uX, -uY)$$

In the lateral aberration diagram, the horizontal axis indicates the height of incidence upon the pupil, and the vertical axis indicates an aberration amount. Since each surface basically assumes a planarly symmetric shape in which the yz plane is a symmetric plane, the plus direction and the minus direction of the vertical field angle are the same even in the lateral aberration diagram, and therefore the lateral aberration diagram in the minus direction is omitted in order to simplify the diagram.

Figure 1:
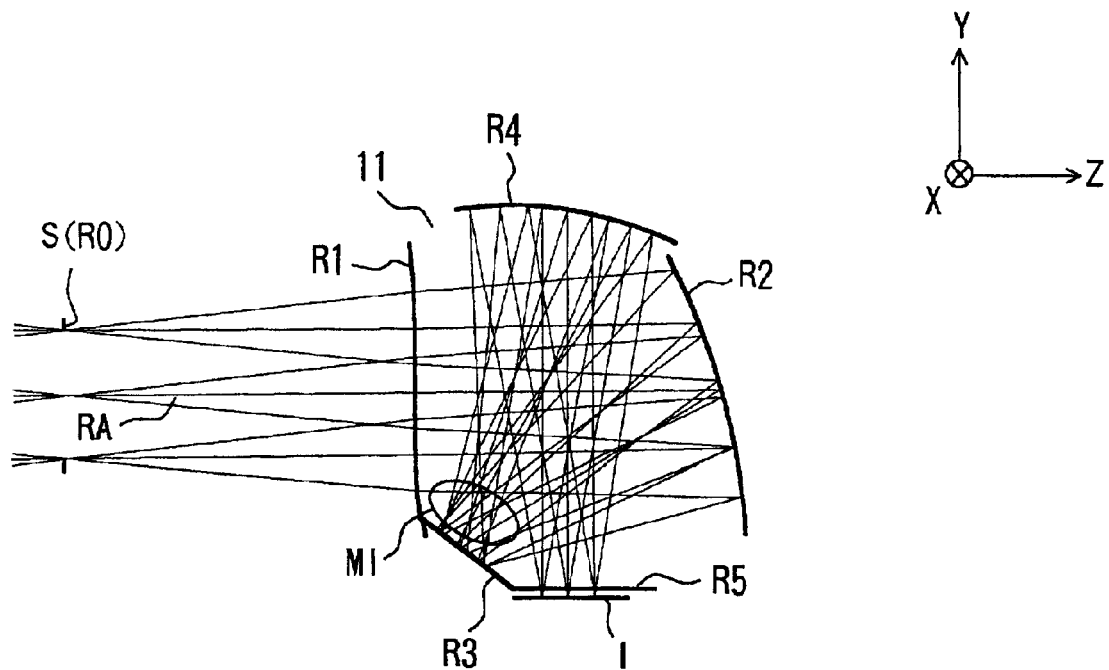
FIG. 1 is an optical sectional view in a YZ plane of an image formation optical system, which is an embodiment of the present invention.

FIG. 1 is a sectional view in the YZ plane of an image formation (image-taking) optical system that uses a reflective optical element, which is an embodiment of the present invention.

In FIG. 1, the reflective optical element 11 has two refraction surfaces and three curved reflecting surfaces, and is integrally made of a transparent member such as glass. This optical element 11 is formed with a refraction surface (incidence surface) R1 with refractive power, three reflecting surfaces of a concave reflecting surface R2, a concave reflecting surface R3, and a concave reflecting surface R4, and a refraction surface (exit surface) R5, in order in which a light flux from an object passes.

All of the reflecting surfaces R2 to R4 are symmetrical to only the YZ plane. A reference-axis light beam RA that passes through the center of an object surface and through the center of a pupil (aperture-stop S) (or, alternatively, through the center of the pupil and through the center of an image surface) intersects at an intersection of an optical path from the surface R1 to the surface R2 and an optical path from the surface R3 to the surface R4, and intersects at an intersection of an optical path from the surface R2 to the surface R3 and an optical path from the surface R4 to the surface R5. The optical element 11 is made compact by constructing the optical path in such a way as to fold it.

The operation of image formation in this embodiment will now be described. The light flux from the object is subjected to the restriction in the quantity of incident light by the aperture-stop (entrance pupil) S, then enters the incidence surface R1 of the optical element 11, is then reflected by the reflecting surfaces R2 and R3 so as to temporarily form an intermediate image, is then reflected by the reflecting surface R4, is then emitted from the exit surface R5, and forms an image on an image pickup surface I (e.g., a light receiving surface of an image pickup device of a CCD or CMOS) again.

The object light flux forms an intermediate image in an area MI between the reflecting surface R3 and the reflecting surface R4, and, likewise, the pupil light flux forms an intermediate image between the reflecting surface R3 and the reflecting surface R4.

Thus, the optical element 11 is provided with a desired optical performance by the refractive power of the incidence/exit surface and by the refractive power of the plurality of curved reflecting surfaces therein, and, as a whole, the optical element 11 functions as a lens unit having positive refractive power.

<Numerical Example 1>

Next, a numerical example of the first embodiment will be shown. This numerical example shows the case of a reflective type image formation optical element whose vertical field angle is 11.8 degrees and whose horizontal field angle is 20.8 degrees.

Vertical half-field angle 5.9
Horizontal half-field angle 10.4
Aperture-stop diameter 6.00

| i | Yi | Zi | θi | Di | Ndi | vdi | |
|---|------|-------|-------|-------|---------|-------|---------------------|
| 0 | 0.00 | 0.00  | 0.00  | 16.00 | 1       |       | Aperture-stop |
| 1 | 0.00 | 16.00 | 0.00  | 14.00 | 1.52996 | 55.80 | Refraction surface |
| 2 | 0.00 | 30.00 | 16.00 | 14.00 | 1.52996 | 55.80 | Reflecting surface |
| 3 | -7.42 | 18.13 | 52.50 | 16.50 | 1.52996 | 55.80 | Reflecting surface |
| 4 | 8.36 | 22.95 | 81.50 | 17.50 | 1.52996 | 55.80 | Reflecting surface |
| 5 | -9.14 | 22.95 | 90.00 | 0.45 | 1 | | Refraction surface |
| 6 | -9.59 | 22.95 | 90.00 | 1 | | | Image surface |

Spherical shape
R5 surface r5 = ∞
Aspherical shape
R1 surface

C02 = -3.61773e-03   C20 = 2.04814e-02   C40 = 2.56738e-05
C03 = -1.30274e-03   C21 = 2.22958e-04
C04 = 1.43421e-04    C22 = 3.10866e-05
R2 surface C02 = -1.57440e-02   C20 = -1.53043e-02   C40 = 8.28243e-06
C03 = 6.39788e-05    C21 = 1.57674e-04
C04 = 2.19551e-06    C22 = -7.64331e-06
R3 surface C02 = 8.10265e-03    C20 = 1.13348e-02    C40 = 1.02340e-04
C03 = 7.12443e-04    C21 = 1.91520e-03
C04 = 8.29073e-05    C22 = 2.66582e-04
R4 surface C02 = -3.02067e-02   C20 = -2.82257e-02   C40 = -2.30547e-05
C03 = 1.19392e-04    C21 = -1.32651e-04
C04 = -8.89720e-06   C22 = -3.87176e-05

Figure 2:
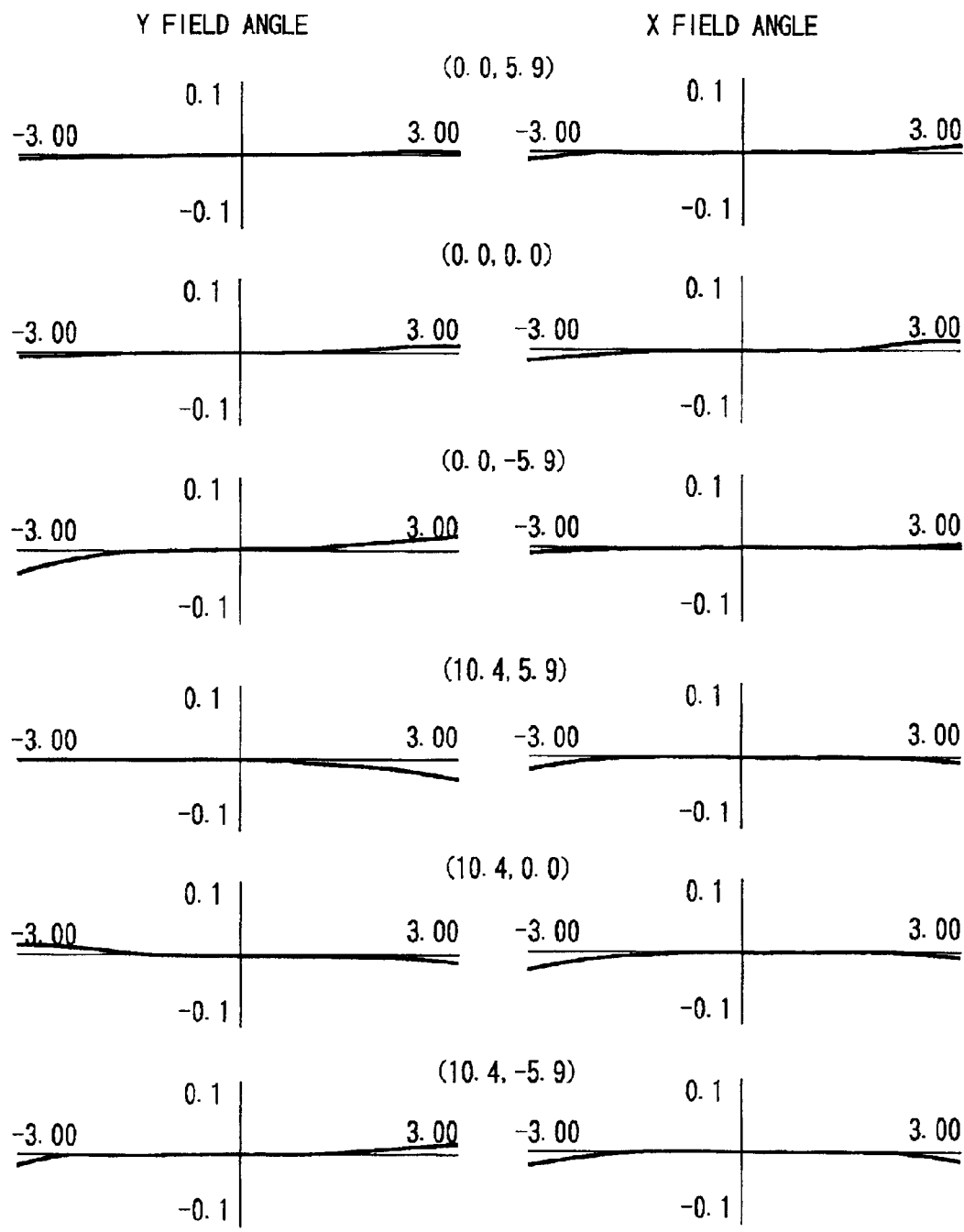
FIG. 2 shows the lateral aberration in a numerical example 1 of the image formation optical system shown in FIG. 1.

The lateral aberration diagram of the reflective optical element of Numerical Example 1 is shown in FIG. 2.

The maximum effective diameter ea of the reflective optical element 11 is 11.23 mm in the YZ plane on the reflecting surface R2, and the minimum effective diameter thereof is 3.07 mm on the reflecting surface R3. Since the effective diameter on the reflecting surface R2 is small as mentioned here, it becomes possible to dispose the exit refraction surface R5 between the reflecting surface R2 and the reflecting surface R3. The size of the reflecting surface R3 in this case nears the size of the intermediate-image-forming surface.

Herein, the size in the YZ plane of the intermediate-image-forming surface (MI) appearing in the vicinity of the reflecting surface R3 is paraxially calculated. The focal length in the YZ plane of the optical part from the pupil (aperture-stop S) to the intermediate-image forming surface MI, i.e., of the three optical surfaces R1 to R3 is 9.4 mm, and the maximum field angle in the YZ plane is 11.8°, and therefore the size of the intermediate-image forming surface in the YZ plane is 2×9.4×tan(11.8)=1.968 mm.

The maximum effective diameter of the optical element 11 is on the reflecting surface R2, and the size thereof in the YZ plane is 11.23 mm. This is five times or more as large as the effective diameter at the intermediate-image formation position, and satisfies the following condition:

$$4 \cdot f \cdot \tan\theta < ea \quad (1)$$

Accordingly, if the focal length of the optical part disposed between the pupil and the intermediate-image forming surface so as to satisfy the condition (1) is shortened, the size of the intermediate-image forming surface can be restricted, and the minimum effective diameter can be small. Therefore, the normals of the reflecting surfaces can be designed to face each other, and the optical path (reference axis) can be caused to intersect two times or more in an area enclosed by the plurality of reflecting surfaces.

A description has been given of the prism-shaped reflective optical element 11 in which the off-axial reflecting surface is provided as an internal reflection surface in this embodiment. However, it is permissible to form each reflecting surface with a reflecting mirror and use a reflective optical element in which the medium in the area enclosed by the reflecting mirrors consists of air.

Additionally, although a description has been given of the reflective optical element that has the three reflecting surfaces in this embodiment, the number of reflecting surfaces is not limited to three. However, preferably, the number thereof is at least three from the viewpoint of aberration correction.

Additionally, although a description has been given of the reflective optical element having the off-axial reflecting surface in this embodiment, the reflecting surface used for the reflective optical element of the present invention is not limited to this.

Additionally, it is possible to construct an image formation optical system provided with a plurality of optical elements that includes the reflective optical element shown in this embodiment, and change the relative positions of these optical elements, and thereby construct a variable-power optical system.

Figure 3:
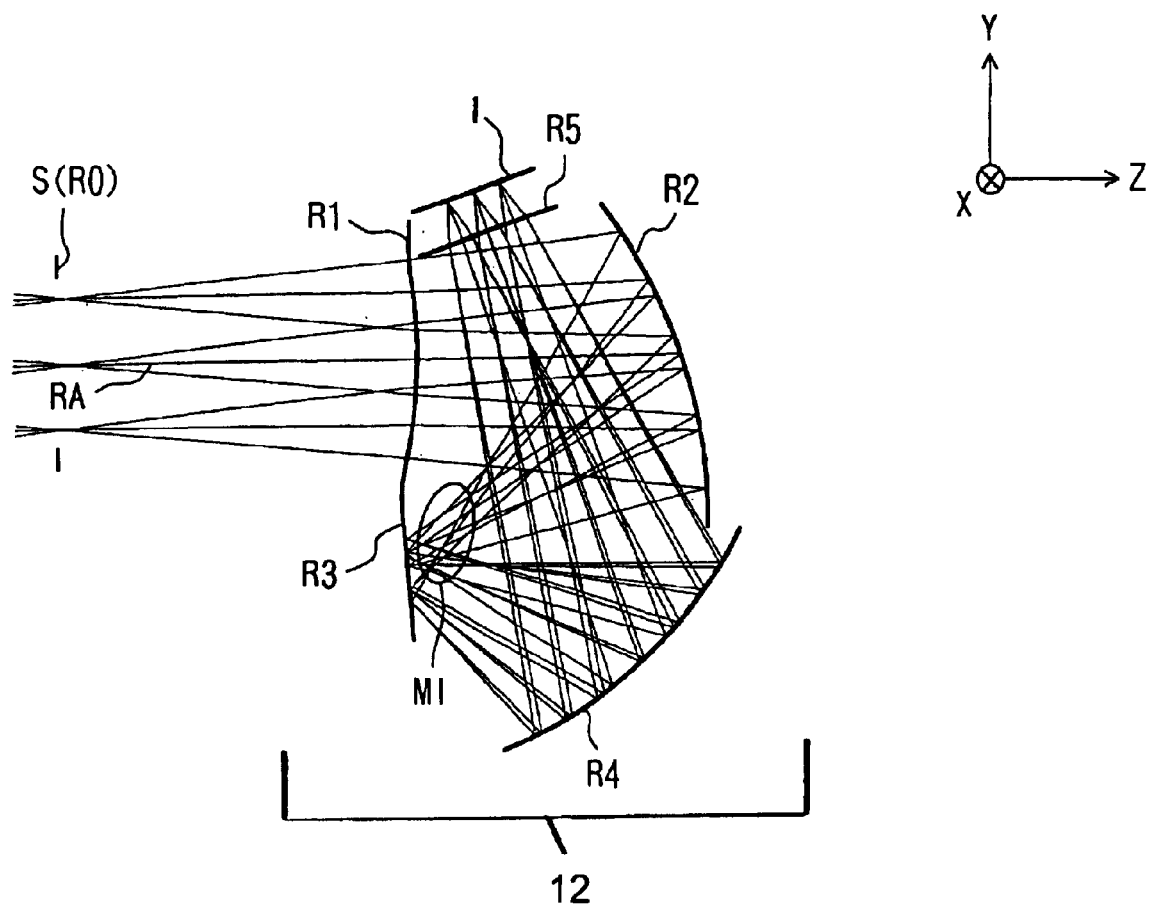
FIG. 3 is an optical sectional view in a YZ plane of an image formation optical system which is another embodiment of the present invention.

FIG. 3 is a sectional view in the YZ plane of an image formation (image-taking) optical system that uses a reflective optical element, which is another embodiment of the present invention.

In FIG. 3, the reflective optical element 12 has two refraction surfaces and three curved reflecting surfaces, and is integrally made of a transparent member such as glass. This optical element 12 is formed with a refraction surface (incidence surface) R1 with refractive power, three reflecting surfaces of a concave reflecting surface R2, a concave reflecting surface R3, and a concave reflecting surface R4, and a refraction surface (exit surface) R5, in order in which a light flux from an object passes.

All of the reflecting surfaces R2 to R4 are symmetrical to only the YZ plane. A reference-axis light beam RA that passes through the center of an object surface and through the center of a pupil (aperture-stop S) (or, alternatively, through the center of the pupil and through the center of an image surface) intersects at an intersection of an optical path from the surface R1 to the surface R2 and an optical path from the surface R4 to the surface R5, and intersects at an intersection of an optical path from the surface R2 to the surface R3 and an optical path from the surface R4 to the surface R5. The optical element 12 is made compact by constructing the optical path in such a way as to fold it.

The operation of image formation in this embodiment will now be described. The light flux from the object is subjected to the restriction of the quantity of incident light by the aperture-stop (entrance pupil), then enters the incidence surface R1 of the optical element 12, is then reflected by the reflecting surfaces R2 so as to temporarily form an intermediate image, is then reflected by the reflecting surfaces R3 and R4, is then emitted from the exit surface R5, and forms an image on an image pickup surface I again.

The object light flux forms an intermediate image in an area MI between the reflecting surface R2 and the reflecting surface R3, and the pupil light flux forms an intermediate image between the reflecting surface R3 and the reflecting surface R4.

Thus, the optical element 12 is provided with a desired optical performance by the refractive power of the incidence/exit surface and by the refractive power of the plurality of curved reflecting surfaces therein, and, as a whole, the optical element 12 functions as a lens unit having positive refractive power.

<Numerical Example 2>

Next, a numerical example of the embodiment shown in FIG. 3 will be shown. This numerical example shows the case of a reflective type image formation optical element whose vertical field angle is 11.8 degrees and whose horizontal field angle is 20.8 degrees.

Vertical half-field angle 5.9
Horizontal half-field angle 10.4
Aperture-stop diameter 6.00

| i | Yi | Zi | θi | Di | Ndi | νdi | |
|---|-----|------|--------|-------|---------|-------|---------------------|
| 0 | 0.00 | 0.00 | 0.00 | 16.00 | 1 | | Aperture-stop |
| 1 | 0.00 | 16.00 | 0.00 | 12.00 | 1.52996 | 55.80 | Refraction surface |
| 2 | 0.00 | 28.00 | 18.00 | 15.50 | 1.52996 | 55.80 | Reflecting surface |
| 3 | −9.11 | 15.46 | 6.00 | 12.00 | 1.52996 | 55.80 | Reflecting surface |
| 4 | −13.99 | 26.42 | −47.00 | 21.00 | 1.52996 | 55.80 | Reflecting surface |
| 5 | 5.74 | 19.24 | −70.00 | 2.00 | 1 | | Refraction surface |
| 6 | 7.62 | 18.56 | −70.00 | | 1 | | Image surface |

Spherical shape
R5 surface r8 = −84.330
Aspherical shape
R1 surface

C02 = −2.71021e−02   C20 = 6.76921e−02   C40 = 2.68286e−04
C03 = 2.15031e−04    C21 = 2.33549e−03   C41 = −9.53078e−07
C04 = 3.56830e−04    C22 = 1.51196e−04   C42 = 2.08245e−06

-continued

C05 = 1.68889e-05   C23 = -5.05128e-06
C06 = -1.35645e-06  C24 = -7.34311e-06
C60 = 4.15300e-07
R2 surface C02 = -2.17579e-02  C20 = -2.27731e-02  C40 = 1.91012e-04
C03 = -4.84383e-05  C21 = -4.87769e-04  C41 = 9.60883e-07
C04 = 6.68097e-06   C22 = 2.19546e-06   C42 = 4.74323e-07
C05 = 7.20165e-07   C23 = 2.66806e-06
C06 = -2.78101e-08  C24 = -3.07563e-07
C60 = 3.52092e-07
R3 surface C02 = 3.38774e-03   C20 = 1.46028e-02   C40 = 7.2426e-05
C03 = 8.17598e-04   C21 = -1.66493e-03  C41 = 7.55779e-05
C04 = 7.50006e-05   C22 = -5.18047e-04  C42 = 1.99363e-05
C05 = -1.20593e-05  C23 = 1.37248e-04
C06 = -1.17277e-05  C24 = 4.76966e-05
C60 = 4.28438e-07
R4 surface C02 = -2.56915e-02  C20 = -1.94744e-02  C40 = 1.75672e-05
C03 = -7.39799e-05  C21 = -2.26918e-04  C41 = 1.76071e-06
C04 = 1.24364e-06   C22 = 6.76674e-06   C42 = -2.23890e-07
C05 = 4.85974e-08   C23 = 1.74836e-06
C06 = -9.38861e-08  C24 = -416033e-07
C60 = -3.90073e-08

Figure 4:
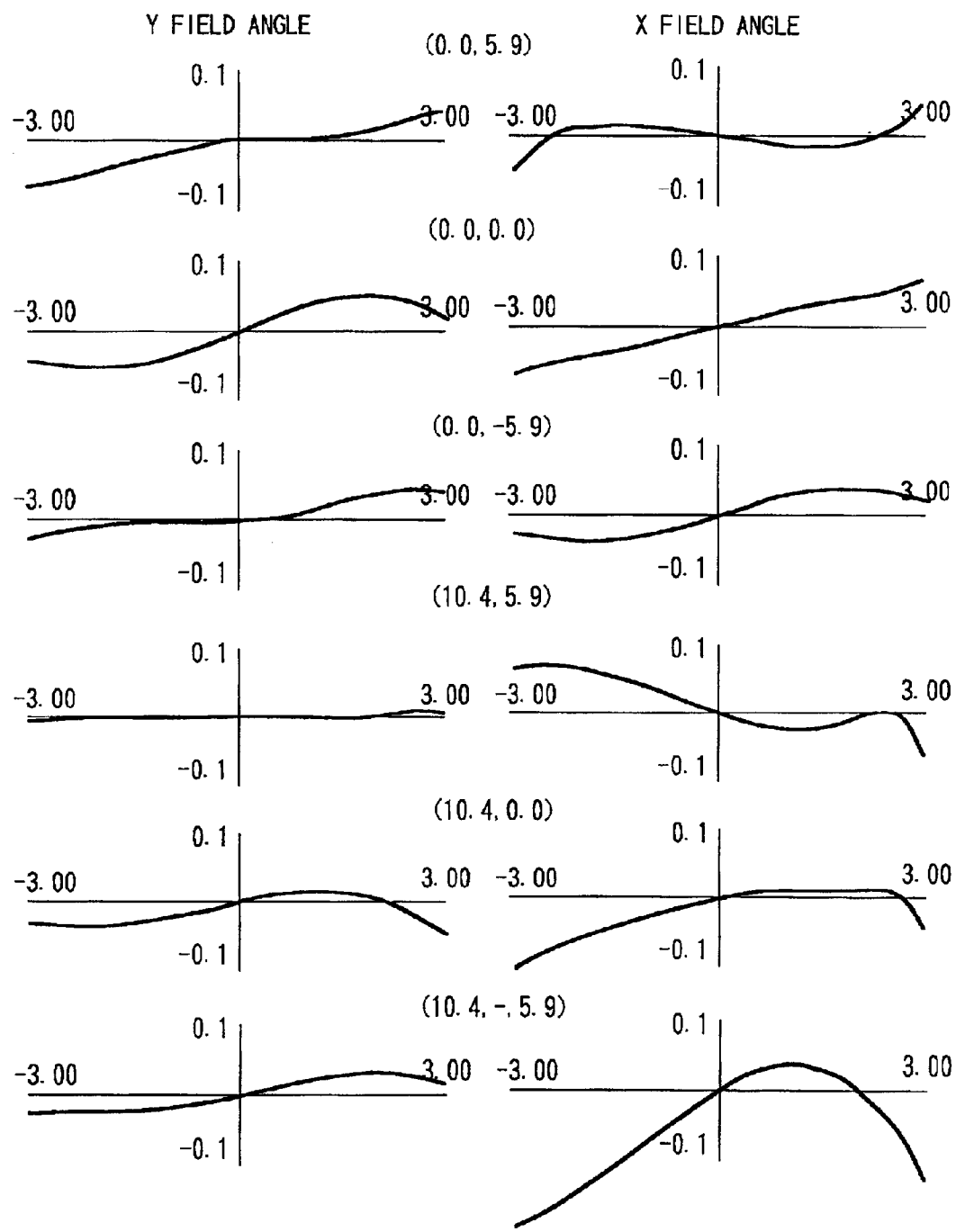
FIG. 4 shows the lateral aberration in a numerical example 2 of the image formation optical system shown in FIG. 3.

The lateral aberration diagram of the reflective type optical element of Numerical Example 2 is shown in FIG. 4.

The maximum effective diameter of the reflective optical element 12 is 12.48 mm in the YZ plane on the reflecting surface R2, and the minimum effective diameter thereof is 3.21 mm on the reflecting surface R3. Since the effective diameter on the reflecting surface R2 is small as mentioned here, it becomes possible to dispose the reflecting surface R4 between the reflecting surface R2 and the reflecting surface R3. The size of the reflecting surface R3 in this case nears the size of the intermediate-image-forming surface.

Herein, the size in the YZ plane of the intermediate-image-forming surface (MI) appearing in the vicinity of the reflecting surface R3 is paraxially calculated.

The focal length in the YZ plane of the optical part from the pupil (aperture-stop S) to the intermediate-image forming surface MI, i.e., of the two optical surfaces R1 and R2 (note that they are different from the embodiment in the position of the intermediate image) is 7 mm, and the maximum field angle in the YZ plane is 11.8°, and therefore the size of the intermediate-image forming surface in the YZ plane is 2×7×tan(11.8)=1.462 mm. The maximum effective diameter of the optical element 12 is on the reflecting surface R2, and the size thereof in the YZ plane is 12.48 mm. This is 8.5 times or more as large as the intermediate image, and satisfies the following condition:

$$4 - f \cdot \tan\theta < ea \quad (1)$$

Accordingly, if the focal length of the optical part disposed between the pupil and the intermediate-image forming surface so as to satisfy the condition (1) is shortened, the size of the intermediate-image forming surface can be restricted, and the minimum effective diameter can be small. Therefore, the normals of the reflecting surfaces can be designed to face each other, and the optical path (reference axis) can be caused to intersect two times or more in a part enclosed by the plurality of reflecting surfaces.

A description has been given of the prism-shaped reflective optical element 12 in which the off-axial reflecting surface is provided as an internal reflection surface in this embodiment. However, it is permissible to form each reflecting surface with a reflecting mirror and use a reflective optical element in which the medium in the area enclosed by the reflecting mirrors consists of air.

Additionally, although a description has been given of the optical element that has three reflecting surfaces in this embodiment, the number of reflecting surfaces is not limited to three. However, preferably, the number thereof is at least three from the viewpoint of aberration correction.

Additionally, although a description has been given of the optical element having the off-axial reflecting surface in this embodiment, the reflecting surface used for the reflective optical element of the present invention is not limited to this.

Additionally, it is possible to construct an image formation optical system provided with a plurality of optical elements that includes the reflective optical element shown in this embodiment, and change the relative positions of these optical elements, and thereby construct a variable-power optical system.

Figure 5:
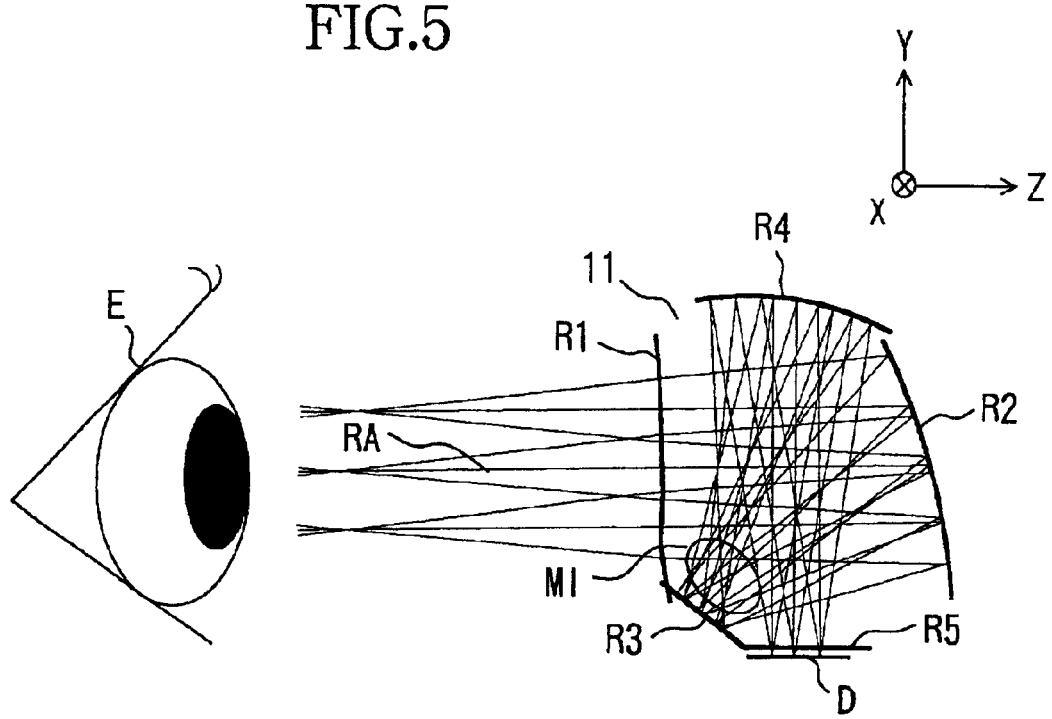
FIG. 5 is an optical sectional view in a YZ plane of an observation optical system which is another embodiment of the present invention.

FIG. 5 shows a case in which the reflective optical element 11 of FIG. 1 is used as an observation optical system of a head-mounted display (HMD). In this embodiment, D in the figure designates an image display panel, such as a liquid crystal display, and E designates the eye of an observer. The image size of the image display panel D is 4.27×2.53 mm.

The optical operation in this embodiment will now be described. A light flux from the image display panel D enters the refraction surface (incidence surface) R5 of the optical element 11, is then reflected by the reflecting surface R4 and forms an intermediate image temporarily, is then reflected by the reflecting surfaces R3 and R2, is then emitted from the exit surface R1, and enters the eye E of the observer.

The object light flux forms an intermediate image in an area MI between the reflecting surface R4 and the reflecting surface R3, and, likewise, the pupil light flux forms an intermediate image between the reflecting surface R4 and the reflecting surface R3. At this time, the pupil diameter is 6 mm, the eye point is 16 mm, and the focal length of the optical element 11 is -11.7 mm. The principal point distance on the pupil side is 12 mm from the pupil rearward.

If an intermediate image is temporarily formed in the optical system, the focal length becomes negative, and converging action are provided. At this time, the position of the principal point is set to be apart from the optical system, and therefore the eye point can be sufficiently kept in spite of the fact that the focal length is small. In other words, the optical system which performs the intermediate image formation has an advantage wherein the optical design does not become so difficult even if the image display panel D becomes small.

In this embodiment, since the size of the intermediate image is reduced, and the optical path is folded so that the reference-axis light beam RA intersects two times or more, the optical element can be made compact, and, as a whole, the HMD can be made compact even if the intermediate image is formed inside the optical element 11.

A description has been given of the prism-shaped reflective type optical element 11 in which the off-axial reflecting surface is provided as an internal reflection surface in this embodiment. However, it is permissible to form each reflecting surface with a reflecting mirror and use a reflective optical element in which the medium in the area enclosed by the reflecting mirrors consists of air.

Additionally, although a description has been given of the reflective optical element that has the three reflecting surfaces in this embodiment, the number of reflecting surfaces is not limited to three. However, preferably, the number thereof is at least three from the viewpoint of aberration correction.

Additionally, although a description has been given of the reflective optical element having the off-axial reflecting surface in this embodiment, the reflecting surface used for the reflective optical element of the present invention is not limited to this.

Additionally, it is possible to construct an observation optical system provided with a plurality of optical elements that includes the reflective optical element shown in this embodiment.

Figure 6:
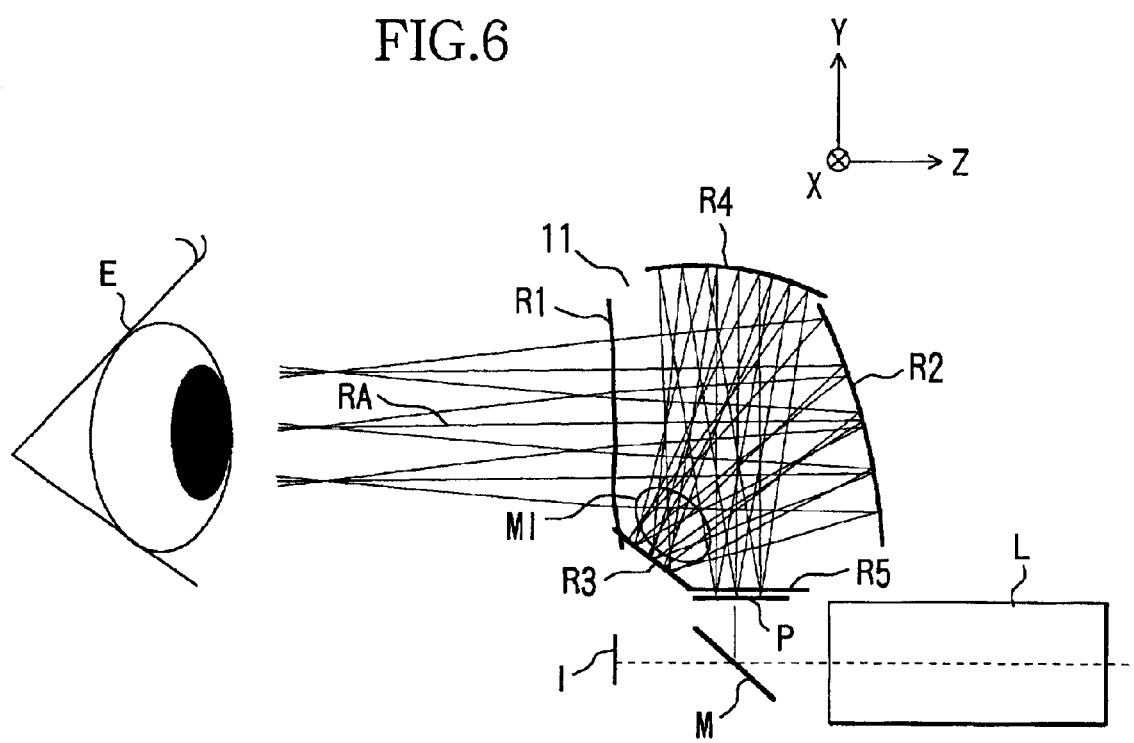
FIG. 6 is an optical sectional view in a YZ plane of an observation optical system which is still another embodiment of the present invention.

FIG. 6 shows a case in which the reflective optical element 11 of FIG. 1 is used as an ocular optical system that constitutes a finder optical system of a single lens reflex camera.

In the figure, P designates a focusing plate, M designates a quick return mirror, L designates an image-taking optical system, I designates an image pick up surface (e.g., a light receiving surface of an image pickup device such as a CCD or CMOS) of the image pickup optical system L, and E designates the eye of a person.

The optical operation in this embodiment will now be described. A light flux from the object undergoes an optical action in the image-taking optical system L, is then reflected by the quick return mirror M, and forms an image on the focusing plate P.

The light flux that has been diffused on the focusing plate P enters the incidence surface R5 of the optical element 11, is then reflected by the surface R4 and forms an intermediate image temporarily, is then reflected by the surfaces R3 and R2, is then emitted from the exit surface R1, and strikes the eye E of the photographer. The object light flux forms an intermediate image in an area MI between the reflecting surface R4 and the reflecting surface R3, and, likewise, the pupil light flux forms an intermediate image between the reflecting surface R4 and the reflecting surface R3. At this time, the pupil diameter is 6 mm, and the eye point is 16 mm.

Usually, a single lens reflex camera uses a penta-roof prism that has a laterally reversing action, but, in this embodiment, a roof-shaped surface is not needed because of the intermediate image formation.

Additionally, like the embodiment shown in FIG. 5, the optical system has an advantage wherein the optical design does not become so difficult even if the size of the image pickup device I is small.

In this embodiment, since the size of the intermediate image is reduced, and the optical path is folded so that the reference-axis light beam RA intersects two times or more, the optical element 11 can be made compact, and, as a whole, the ocular optical system can be made compact even if the intermediate image is formed inside the optical element 11.

A description has been given of the prism-shaped reflective optical element 11 in which the off-axial reflecting surface is provided as an internal reflection surface in this embodiment. However, it is permissible to form each reflecting surface with a reflecting mirror and use a reflective optical element in which the medium in the area enclosed by the reflecting mirrors consists of air.

Additionally, although a description has been given of the reflective optical element that has three reflecting surfaces in this embodiment, the number of reflecting surfaces is not limited to three. However, preferably, the number thereof is at least three from the viewpoint of aberration correction.

Additionally, although a description has been given of the reflective optical element having the off-axial reflecting surface in this embodiment, the reflecting surface used for the reflective optical element of the present invention is not limited to this.

Additionally, it is permissible to construct an ocular optical system provided with a plurality of optical elements that includes the reflective optical element shown in this embodiment.

As described above, according to the embodiments shown in FIG. 1 through FIG. 6, the optical path (reference axis) can be caused to intersect two times or more in the area enclosed by three or more reflecting surfaces of the reflective optical element, and the size of the effective diameter, in at least one of the three or more reflecting surfaces can be reduced to be less than half the maximum effective diameter such that the size of the effective diameter in the vicinity of an intermediate-image formation position or a pupil image formation position where the effective diameter of the optical system becomes smallest, is reduced to be about half the maximum effective diameter.

Accordingly, in spite of the fact that the optical path length is lengthened to obtain an intermediate image, it is possible to realize a reflective optical element that is compact and that is capable of emitting a light flux from between the reflecting surfaces in the area enclosed by the reflecting surfaces without any difficulty.

Next, a description will be given of an embodiment of the present invention used for an observation optical system such as a finder optical system of a camera.

The indicating manner of structural parameters of an optical system in the following embodiment, a coordinate system that defines the structural data of the optical system, etc., are substantially the same as the embodiments described above, and only different points will be described here.

In the following embodiment, a spherical surface is expressed in the same way as in the aforementioned embodiments, and a rotationally symmetric aspherical surface is expressed according to the following expression.

$$Z=\{(x^2+y^2)/ri\}/[1+\{1-(1+k)\cdot(x^2+y^2)/ri2\}^{1/2}]+ka(x2+y^2)^2+kb(x^2+y^2)^3+kc(x^2+y^2)^{6+\cdots}$$

The optical system of the following embodiment has at least one rotationally asymmetric aspherical surface, and its shape is expressed according to the following expression.

$$z=A/B+C02y^2+C11xy+C20x^2+C03y^3+C12y^2+C21x^2y+C30x^3+C04y^4+C13xy^3+C22x^2y^2+C31x^3y+C41x^4$$

wherein $$A=(a+b)\cdot(y^2\cdot cos^2t+x^2)$$

$$B=2a\cdot b\cdot\cos t[1+\{(b-a)\cdot y\cdot\sin t/(2a\cdot b)\}+[1+\{(b-a)\cdot y\cdot\sin t/(a\cdot b)\}-\{y^2/(a\cdot b)\}-\{4a\cdot b\cdot\cos^2 t+(a+b)^2\sin^2 t\}x^2/(4a^2b^2\cos^2 t)]^{1/2}].$$

The shape of each of the rotationally asymmetric surfaces in the following numerical example is a planar-base aspherical surface where a=b=8 and t=0 in the curved-surface expression, and is a planarly symmetric shape in which the yz plane serves as a symmetric plane and the odd-ordered terms are 0 while using only the even-ordered terms relative to x. If the following condition is satisfied, a shape symmetrical to the xz plane is shown.

$$C03=C21=0$$

If the following condition is satisfied, a rotationally symmetric shape is shown.

$$C02=C20\ C04=C40=C22/2$$

If these conditions are not satisfied, a non-rotationally symmetric shape is shown.

Figure 7:
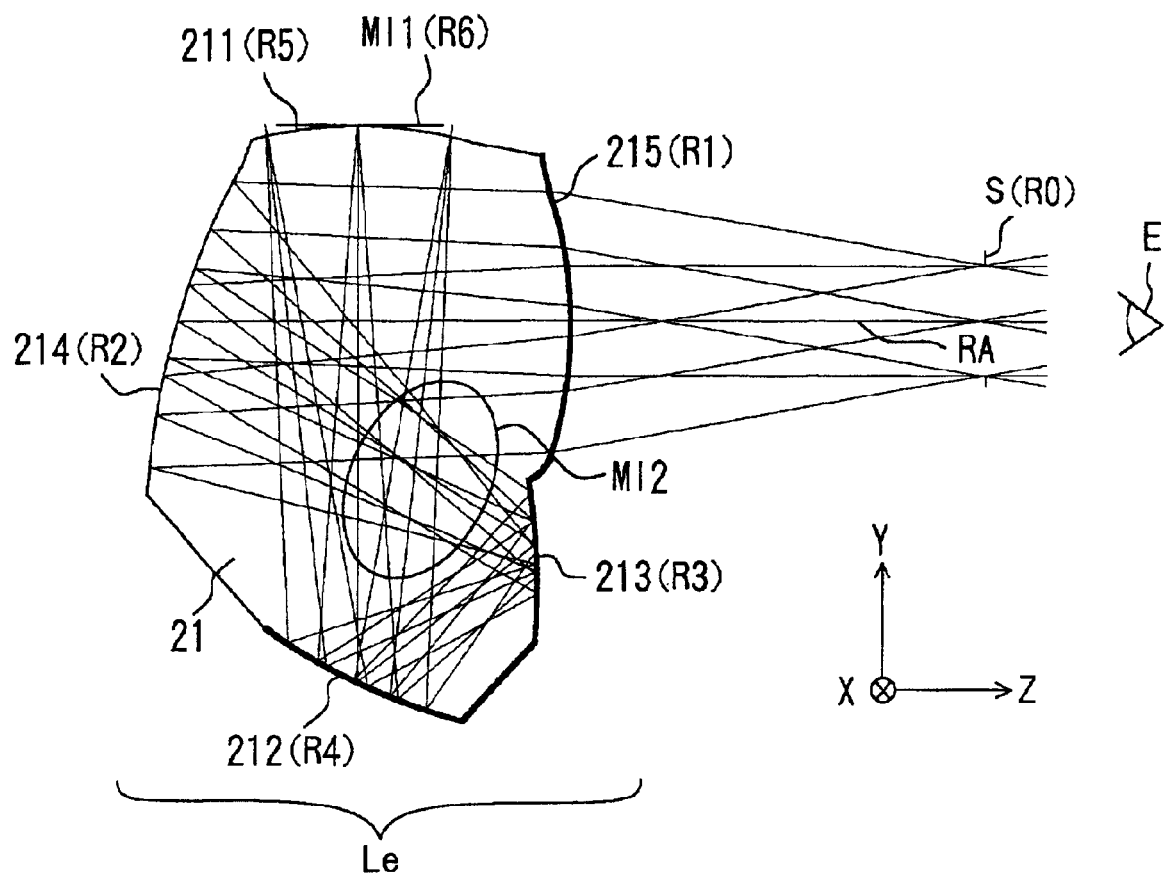
FIG. 7 is a sectional view of an ocular prism used for a finder optical system which is still another embodiment of the present invention.

FIG. 7 is a sectional view of a main part showing the structure of an ocular optical system of the finder optical system, which is another embodiment of the present invention. The ocular optical system Le is constructed of an ocular prism (ocular optical element) 21 whose refractive index is greater than 1, and a light flux from an object image formed in the vicinity of MI1 by an objective optical system, not shown, is guided from an incidence surface (first refraction surface) 211 of the ocular prism 21 to the inside of the ocular prism 21.

The light flux incident upon the ocular prism 21 from the incidence surface 211 is reflected by a first reflecting surface 212, and is guided to a second reflecting surface 213. The light flux reflected by the second reflecting surface 213 is guided to the third reflecting surface 214, is then reflected by the third reflecting surface 214, is then guided to an exit surface (second refraction surface) 215, and is emitted from the prism 21 outward. The light flux emitted from the prism 21 passes through the pupil S and reaches the eye E of an observer who is observing a finder image.

The light flux traveling from the second reflecting surface 213 to the third reflecting surface 214 in the ocular prism 21 forms an intermediate image in the vicinity of an area MI2 near the second reflecting surface 213 between the second reflecting surface 213 and the third reflecting surface 214, and an object image is observed as an erected image.

Numerical Example 3 of the embodiment of FIG. 7 is shown as follows. The ocular prism 21 shown in FIG. 7 is an ocular optical system. Therefore, in Numerical Example 3 of the present invention, the center of the pupil S is defined as the original point of the absolute coordinate system, and the aperture-stop disposed at the position of the pupil S is represented as the surface R0, the second refraction surface 215 which is an exit surface is represented as the surface R1, the third reflecting surface 214 is represented as the surface R2, the second reflecting surface 213 is represented as the surface R3, the first reflecting surface 212 is represented as the surface R4, the first refraction surface 211 which is an incidence surface is represented as the surface R5, and the position of the first image formation surface MI1 by the objective optical system is represented as the surface R6.

NUMERICAL EXAMPLE 3

| i | Yi | Zi | θi | Di | Ndi | νdi | |
|---|------|-------|--------|-------|---------|-------|------------------|
| 0 | 0.00 | 0.00 | 0.00 | 15.00 | 1 | | Pupil |
| 1 | 0.00 | 15.00 | 0.00 | 14.00 | 1.49171 | 57.40 | Refraction surface |
| 2 | 0.00 | 29.00 | −16.00 | 15.00 | 1.49171 | 57.40 | Reflecting surface |
| 3 | 7.95 | 16.28 | 3.00 | 8.00 | 1.49171 | 57.40 | Reflecting surface |
| 4 | 12.88 | 22.62 | 64.00 | 20.00 | 1.49171 | 57.40 | Reflecting surface |
| 5 | −7.12 | 22.62 | 90.00 | 0.00 | 1 | | Refraction surface |
| 6 | −7.12 | 22.62 | 90.00 | 0.00 | 1 | | First image formation surface |

Spherical shape
Surface R0

R0 = ∞
Surface R5

R5 = 15.000

Rotationally symmetric aspherical shape
Surface R1

R1 = 12.251
k = 0
ka = −0.67731E−03   kb = 0.16394E−04   kc = −0.32619E−06
Rotation asymmetrical aspherical shape
Surface R2

C02 = −0.16147E−01   C20 = −0.40750E−03   C04 = −0.12742E−04
C22 = −0.96860E−04   C40 = −0.33490E−04
Surface R3

C02 = 0.14590E−01   C20 = 0.20640E−02   C04 = 0.30955E−03
C22 = −0.45726E−02   C40 = 0.33869E−01
Surface R4

C02 = 0.23063E−01   C20 = −0.61302E−01   C04 = −0.24134E−03
C22 = −0.91348E−02   C40 = −0.10363E+00

This embodiment does not require a roof-shaped reflecting surface that causes image deterioration when an image is reversed. Further, various aberrations are excellently corrected by setting the three reflecting surfaces to be a rotationally asymmetric aspherical surface and disposing them eccentrically. This structure improves the observing ability of the finder optical system.

In the ocular prism 21, the reference axis between the incidence surface 211 and the first reflecting surface 212 and the reference axis between the second reflecting surface 213 and the third reflecting surface 214 intersect with each other, and the reference axis between the incidence surface 211 and the first reflecting surface 212 and the reference axis between the third reflecting surface 214 and the exit surface 215 intersect with each other.

Accordingly, in the same plane, the optical path length, which is lengthened because of intermediate-image formation, is folded compactly, efficiently, and in a minimum number of reflecting surfaces.

Further, the curvature of each surface is set so as to place the intermediate-image formation position in the area MI2 near the observation side between the second reflecting surface 213 and the third reflecting surface 214 (especially, near the second reflecting surface 213), and therefore power is appropriately shared by each surface. Accordingly, a light flux is made compact while restricting a decentering aberration, so that the effective diameter in the reflecting surface is prevented from becoming greater. This structure realizes size reduction of the finder optical system and improves the observing ability thereof.

When the optical path is folded in this embodiment, an angular difference between the exit surface 215 and the second reflecting surface 213 is small, and angles of the exit surface 215, the second reflecting surface 213, and the third reflecting surface 214 disposed to face the two surfaces with respect to the Y axis in the figure are small.

Therefore, the plane can be arranged to have less projection toward the Z axis. A thin finder optical system can be realized by applying this arrangement to the thickness direction of the camera. Further, since an angular difference between the first reflecting surface 212 and the fourth reflecting surface 214 which adjoin each other on the same side is small, and an angular difference between the exit surface 215 and the second reflecting surface 213 is small, the shape is advantageous from the viewpoint of performance and planar accuracy in molding.

Further, as a result of integral molding, the ocular prism 21 of this embodiment is a single optical element made up of an image erecting system and an eyepiece for observing an image. The use of the ocular prism 21 realizes cost reductions because there is no need to use an independent eyepiece.

The whole structure of the finder optical system of this embodiment will be hereinafter described with reference to FIG. 8.

The objective optical system 20 is made up of a fixed first unit I, a negative second unit II, and a positive third unit III in order from the object side, and, when the power is varied, the second and third units move.

Figure 8:
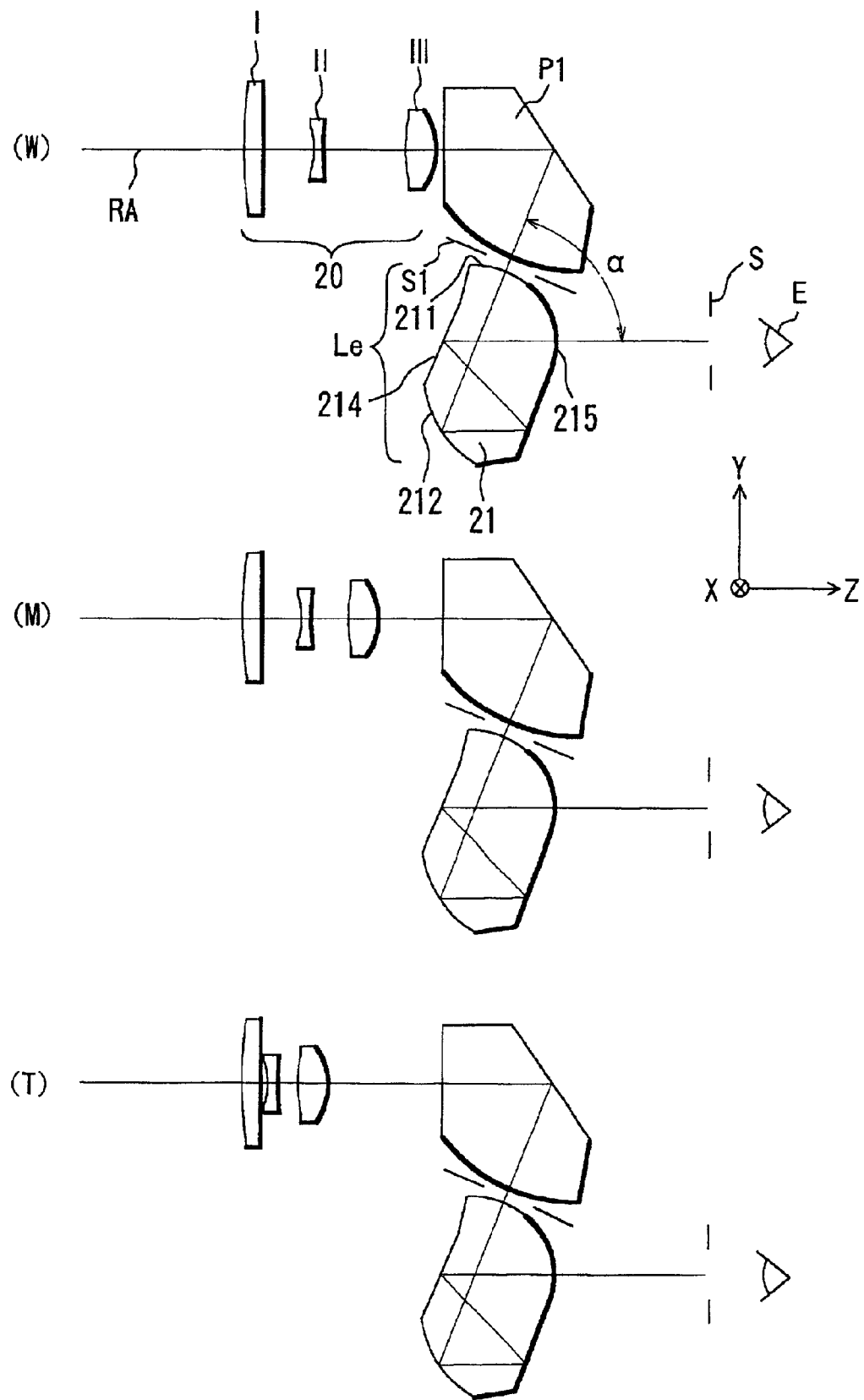
FIG. 8 is a sectional view showing the whole structure of the finder optical system in which the ocular prism shown in FIG. 7 is used.

The type of the objective optical system 20 is not limited to the one shown in FIG. 8. The objective optical system 20 may be a monofocal one.

In FIG. 8, (W), (M), and (T) designate a wide-angle end, an intermediate position, and a telephoto end, respectively. A light flux from the objective optical system 20 is reflected by a reflective prism P1 having a reflecting surface toward the object in some degree, and forms an intermediate image in the vicinity of an aperture-stop (view frame) S1. An optical path in an ocular optical system (including the ocular prism 21) following the first image formation surface is the same as that of FIG. 7.

However, preferably, in this structure, the following condition is satisfied by angle α between a reference axis (a reference-axis light beam RA), which is reflected by the reflecting surface of the reflective prism P1, then passes through the aperture-stop S1 and through the incidence surface 211 of the ocular prism 21, and leads to the first reflecting surface 212, and a reference axis, which exits from the exit surface 215 via the third reflecting surface 214 and reaches the center of the pupil S, in order to thin the finder optical system in the direction of object side-observer side (rightward/leftward in the figure).

$$50° < \alpha < 110° \quad (2)$$

If α falls below the lower limit of the condition (2), the reflecting surface of the reflective prism P1 will project to the observer side, and it will become difficult to maintain a view frame (i.e., arrange a holding member which holds the view frame), and to realize the size reduction thereof. In contrast, if α exceeds the upper limit of the condition (2), the distance from the incidence surface of the reflective prism P1 to the surface of the ocular optical system nearest to the eye is increased, and therefore the whole length in the thickness direction of the camera equipped with this finder optical system is increased.

More preferably, angle α satisfies the following condition.

$$60° < \alpha < 90° \quad (3)$$

Accordingly, if the objective optical system and the ocular optical system are each disposed at an appropriate angle described in the condition (2) or (3), the finder optical system can be thinned even if the whole length of the objective optical system is lengthened with high variable power. Additionally, since two optical members (reflective prism P1 and ocular prism 21) other than the objective optical system can be used for the configuration, cost reductions can also be realized.

Next, referring to FIG. 9, a description will be given of a finder optical system which is another embodiment of the present invention that is capable of realizing a size reduction even if higher power variation is performed than in the embodiment shown in FIG. 7 and FIG. 8 and even if the objective optical system is developed laterally (i.e., in a direction substantially perpendicular to the object-observation direction).

Figure 9:
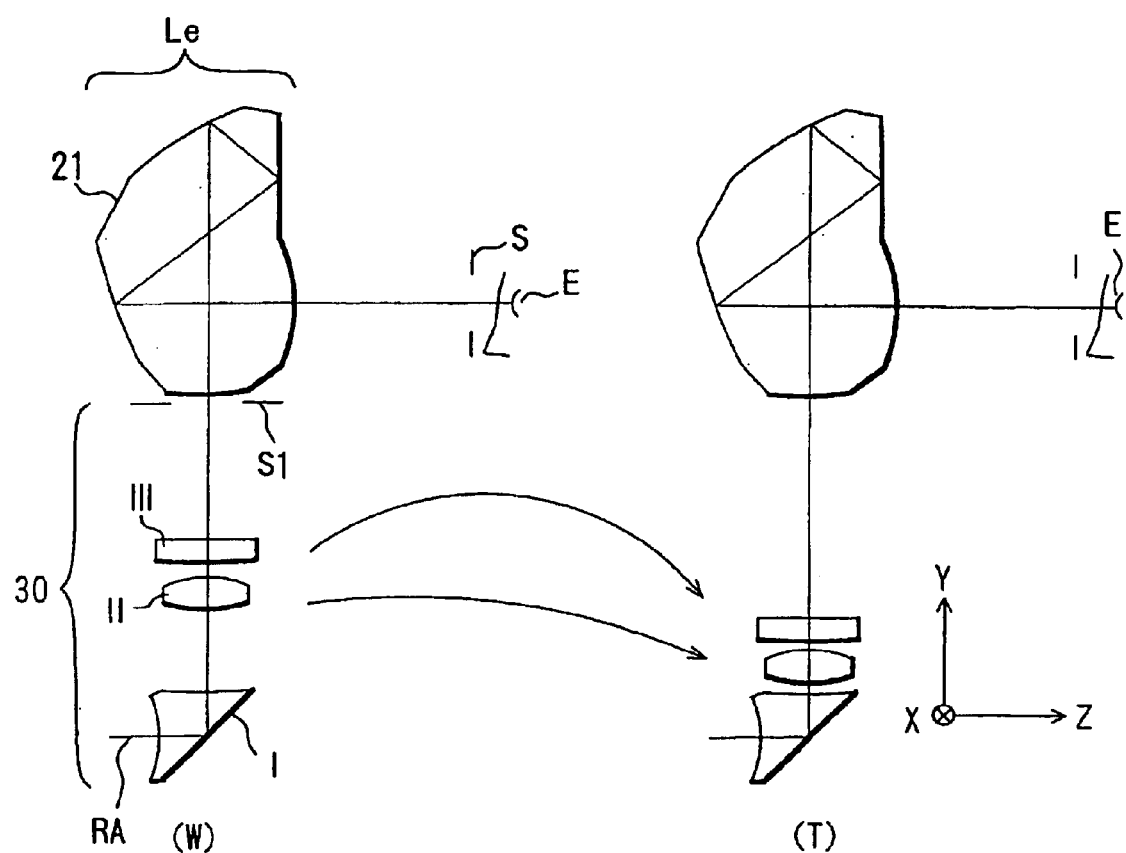
FIG. 9 is a sectional view showing the whole structure of a finder optical system which is still another embodiment of the present invention.
Figure 10:
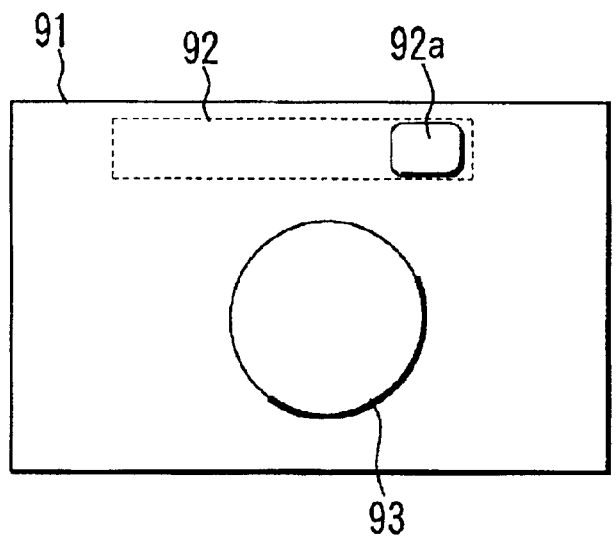
FIG. 10 is a front view, side sectional view, and rear view of a camera equipped with the finder optical system shown in FIG. 9.
Figure 10:
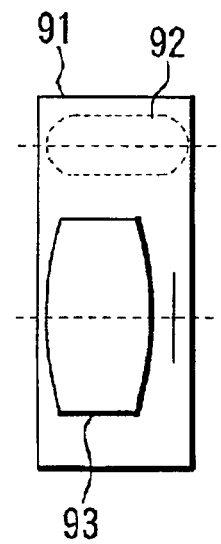
Figure 10:
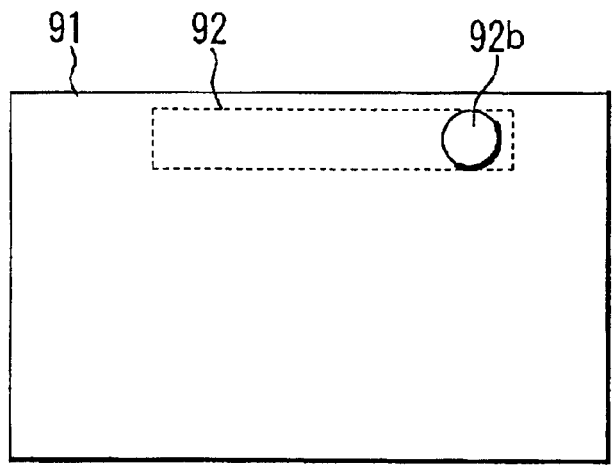

FIG. 9 is a sectional view (i.e., a section seen from the upper side of the camera) of a plane of the finder optical system of this embodiment. FIG. 10 shows a still camera (for example, a digital camera) equipped with the finder optical system of this embodiment.

In FIG. 9, the objective optical system 30 is made up of a negative first unit I, lens units II and III which move in the manner of the arrow when the power is varied, in the traveling direction of a light from the object, and forms an intermediate image in the vicinity of an aperture-stop S1. This finder optical system has the same ocular prism 21 as in the embodiment of FIG. 7, which serves as an ocular optical system Le.

In FIG. 9, (W) and (T) designate a wide-angle end and a telephoto end, respectively. The optical path in the ocular optical system following the first image formation surface in the vicinity of the aperture-stop S1 is the same as the one shown in FIG. 7.

In FIGS. 10(A) through 10(C), 91 designates a camera body, and 92 designates a finder optical system of this embodiment. 92a in FIG. 10(A) designates a finder front window disposed in front of the objective optical system 30. 93 designates an image-taking optical system.

92b in FIG. 10(C) designates an ocular window that faces the exit surface of the ocular prism 21.

In this embodiment, the first unit I of the objective optical system 30 is provided with a reflecting surface, and a lateral space is used, especially in order to thin the finder optical system.

In this case, the whole length of the objective optical system can be secured without any difficulty, and an excellent finder view can be obtained while maintaining its performance even if the variable power ratio rises.

Additionally, since an object image formed by the objective optical system 30 which is laterally developed is guided by folding an optical path like the ocular optical system Le of this embodiment, the camera can be thinned without allowing the surface of the ocular optical system Le nearest to the eye to project from the back of the camera body 92.

Additionally, since the optical path is folded in the same horizontal plane, a spatial allowance is created upward and downward in the camera.

As described above, in this embodiment, the finder optical system can be made compact, and the camera equipped with this optical system can be made compact by a simple structure.

Instead of the finder optical system of this embodiment, the finder optical system shown in FIG. 7 and FIG. 8 can be mounted on the camera body 92.

The finder optical system of each embodiment shown in FIG. 7 through FIG. 9 can be mounted not only on the so-called compact still camera shown in FIG. 10 but also on a single lens reflex camera or on a video camera.

Figure 11:
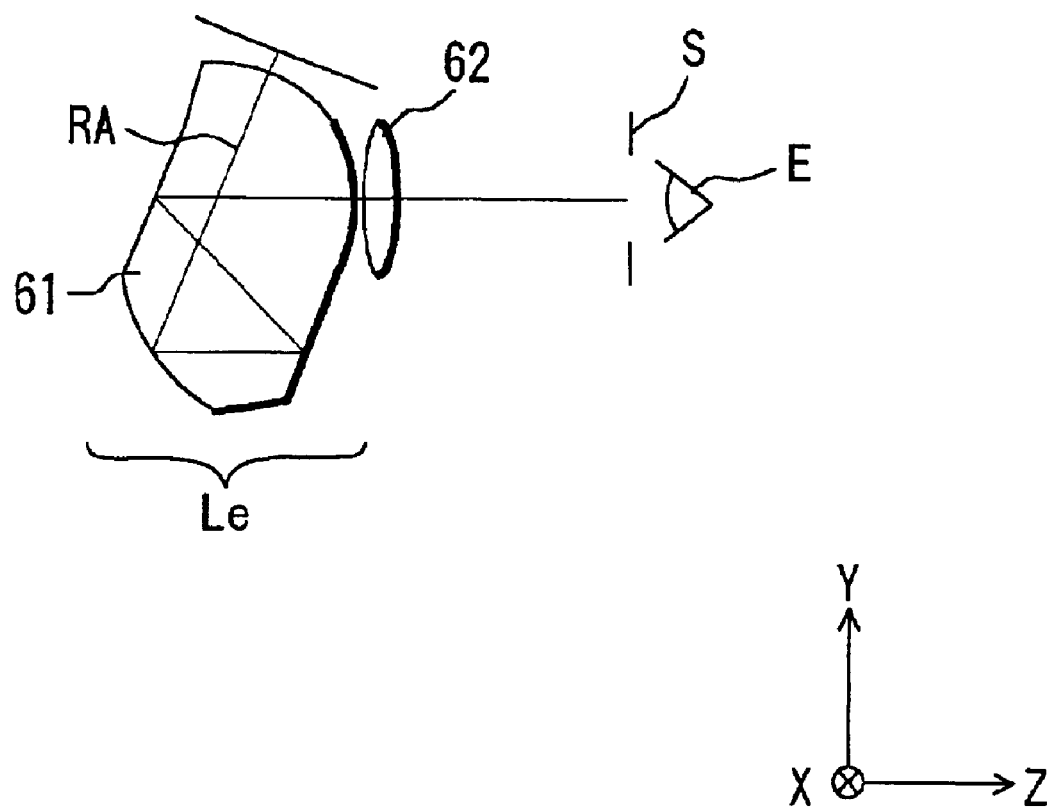
FIG. 11 is a sectional view of an ocular prism used in a finder optical system which is still another embodiment of the present invention.

FIG. 11 is a sectional view of a finder optical system, which is another embodiment of the present invention.

In the finder optical system of this embodiment, a light flux from an object which is guided from an objective optical system, not shown, is guided to the eye E of an observer through an ocular prism 61 which is almost the same as in FIG. 7.

However, in this embodiment, an eyepiece lens 62 is disposed on the eye side from the exit surface of the ocular prism 61.

As a result, the additional aberration correcting operation by the eyepiece lens 62 and the diopter correcting operation for observers can be obtained in addition to the aberration correcting operation by the ocular prism 61.

A description has been given of a case in which the ocular prism where the two refraction surfaces and the three internal reflection surfaces are formed integrally with the transparent member is used in each embodiment shown in FIG. 7 through FIG. 11. However, an external reflecting surface (mirror) instead of the internal reflection surface can be combined to construct an ocular optical system.

As described above, according to the embodiments shown in FIG. 7 through FIG. 11, the optical path is folded by the three reflections by the ocular optical element, and the reference axis is caused to intersect two times between the second reflecting surface and the third reflecting surface and between the third reflecting surface and the pupil, and thereby it is possible to realize a finder optical system that is small as a whole and that is provided with an ocular optical system which is small and which is capable of reversing an image by a minimum number of reflecting surfaces, in spite of the fact that the optical path length lengthens because of the intermediate image formation in the ocular optical system.

Since the light flux reflected by the second reflecting surface is designed to form an intermediate image between the second reflecting surface and the third reflecting surface in the area enclosed by each reflecting surface of the ocular optical system, the light flux can be made compact so as to reduce the size of each reflecting surface, and the ocular optical system and the finder optical system can be made smaller.

Further, various aberrations can be excellently corrected by allowing at least one of the first to third reflecting surfaces to serve as a rotationally asymmetric surface.

Further, if angle $\alpha$ between the reference axis from the object surface to the first reflecting surface and the reference axis from the third reflecting surface to the pupil is designed to satisfy the condition (2) or (3) mentioned above, the finder optical system can be thinned in the direction of the object side-observer side (e.g., in the thickness direction of the camera) even if the variable power is heightened.

While preferred embodiments have been described, it is to be understood that modification and variation of the present invention may be made without departing from the sprit or scope of the following claims.

What is claimed is:

1. A reflective optical element comprising three or more reflecting surfaces by which a light flux from an object is successively reflected, comprising:

a first reflecting surface reflecting the light flux from the object;

a second reflecting surface reflecting the light flux as reflected by the first reflecting surface; and a third reflecting surface reflecting the light flux as reflected by the second reflecting surface;

wherein, when a reference axis is a path of a light ray which comes from a center of an object surface, is then reflected by the reflecting surfaces, and passes through a center of a pupil, then the reference axis includes two intersections, the intersections are at a position where an optical path from the object surface to the first reflecting surface intersects with an optical path from the second reflecting surface to the third reflecting surface, and at a position where the optical path from the object surface to the first reflecting surface intersects with an optical path from the third reflecting surface to the pupil;

wherein an intermediate image is formed in an area enclosed by the reflecting surfaces;

and the following condition is satisfied:

$4 \cdot f \cdot \tan\theta < ea$ where $\theta$ is a maximum field angle through the pupil in a plane that includes the reference axis, f is a focal length of an optical part between the pupil and an intermediate-image plane, and ea is a maximum one of optical effective diameters of surfaces which the reflective optical element has.

2. The reflective optical element according to claim 1, wherein each of the reflecting surfaces has a curved shape that has only one symmetric plane.

3. The reflective optical element according to claim 1, comprising a first refraction surface which the light flux from the object enters, internal reflection surfaces serving as said reflecting surfaces, and a second refraction surface from which the light flux successively reflected by said reflecting surfaces is merged, the first and second refraction surfaces and the internal reflection surfaces being formed integrally with a transparent member.

4. A reflective optical system comprising:

a reflective optical element according to claim 1, wherein light flux from an object forms an image through said reflective optical element.

5. An image display system comprising:

a reflective optical element according to claim 1, and an image display element, wherein an image light flux from said image display element is guided to an eye of an observer through said reflective optical element.

6. A finder optical system comprising:

an objective part which forms an image of an object, an eyepiece part which guides a light flux from the image to an eye of an observer, wherein said eyepiece part includes a reflective optical element according to claim 1.

7. The reflective optical element according to claim 1, wherein the light flux reflected by the second reflecting surface forms the intermediate image between the second reflecting surface and the third reflecting surface in the area enclosed by the first to third reflecting surfaces.

8. The reflective optical element according to claim 1, wherein the light flux reflected by the second reflecting surface forms the intermediate image at a position nearer to the second reflecting surface between the second reflecting surface and the third reflecting surface in the area enclosed by the first to third reflecting surfaces.

9. The reflective optical element according to claim 1, wherein at least one of the first to third reflecting surfaces is a rotationally asymmetric surface.

10. The finder optical system according to claim 6 wherein the eyepiece part includes an ocular optical element, the ocular optical element comprising a first refraction surface which a light flux from the object enters, internal reflection surfaces serving as the first to third reflecting surfaces, and a second refraction surface from which the light flux reflected by the third reflecting surface is emerged, the first and second refraction surfaces and the internal reflection surfaces being formed integrally with a transparent member.

11. The finder optical system according to claim 10, satisfying the condition $50° < \alpha < 110°$ where $\alpha$ is an angle between the reference axis from the first refraction surface to the first reflecting surface and the reference axis from the third reflecting surface to a pupil.

12. The finder optical system according to claim 11, satisfying the condition:

$60° < \alpha < 90°$.

13. The finder optical system according to claim 10, further comprising a second reflective optical element which reflects the light flux from the object and guides the light flux to the ocular optical element.

14. The finder optical system according to claim 6, wherein an on objective part includes an objective optical system having positive refractive power.

* * * * *

UNITED STATES PATENT AND TRADEMARK OFFICE
CERTIFICATE OF CORRECTION

PATENT NO. : 6,758,570 B2
DATED : July 6, 2004
INVENTOR(S) : Toshihiro Sunaga et al.

It is certified that error appears in the above-identified patent and that said Letters Patent is hereby corrected as shown below:

Column 11,
Line 53, please delete "4-$f$-$tan\theta$<ea" and insert therefor -- 4·$f$·$tan\theta$<ea --

Signed and Sealed this

Twenty-ninth Day of March, 2005

JON W. DUDAS
*Director of the United States Patent and Trademark Office*